US007840066B1

(12) United States Patent
Chen et al.

(10) Patent No.: US 7,840,066 B1
(45) Date of Patent: Nov. 23, 2010

(54) METHOD OF ENHANCING A DIGITAL IMAGE BY GRAY-LEVEL GROUPING

(75) Inventors: Zhiyu Chen, Knoxville, TN (US);
Besma Roui Abidi, Knoxville, TN (US);
Mongi Al Abidi, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 1044 days.

(21) Appl. No.: 11/598,943

(22) Filed: Nov. 14, 2006

Related U.S. Application Data

(60) Provisional application No. 60/736,907, filed on Nov. 15, 2005.

(51) Int. Cl.
*G06K 9/00* (2006.01)
*G06K 9/40* (2006.01)
*G06K 9/38* (2006.01)

(52) U.S. Cl. .................. 382/168; 382/254; 382/274

(58) Field of Classification Search .............. 382/162, 382/167–169, 252, 254, 261, 266, 270, 274, 382/275; 358/1.9, 426.14, 443, 466, 518, 358/519, 522; 345/1.2, 596
See application file for complete search history.

(56) References Cited

U.S. PATENT DOCUMENTS

| | | | | | |
|---|---|---|---|---|---|
| 5,014,333 A | * | 5/1991 | Miller et al. | ............... | 382/252 |
| 5,216,753 A | * | 6/1993 | Ng | ............... | 358/1.9 |
| 5,438,633 A | * | 8/1995 | Ghaderi | ............... | 382/270 |
| 5,737,453 A | * | 4/1998 | Ostromoukhov | ............ | 382/275 |
| 5,982,926 A | * | 11/1999 | Kuo et al. | .............. | 382/167 |
| 6,522,784 B1 | * | 2/2003 | Zlotnick | .............. | 382/245 |
| 7,289,666 B2 | * | 10/2007 | Moroney | .............. | 382/167 |
| 7,606,438 B2 | * | 10/2009 | Sugimoto | .............. | 382/266 |
| 2004/0258324 A1 | * | 12/2004 | Liang et al. | ............. | 382/274 |
| 2009/0097747 A1 | * | 4/2009 | Chen et al. | .............. | 382/169 |

* cited by examiner

*Primary Examiner*—Amir Alavi
(74) *Attorney, Agent, or Firm*—Luedeka, Neely & Graham, P.C.

(57) ABSTRACT

Methods for enhancing the quality of an electronic image, including automated methods for contrast enhancement and image noise reduction. In many embodiments the method provides for grouping the histogram components of a low-contrast image into the proper number of bins according to a criterion, then redistributing these bins uniformly over the grayscale, and finally ungrouping the previously grouped gray-levels. The technique is named gray-level grouping (GLG). An extension of GLG called Selective Gray-Level Grouping (SGLG), and various variations thereof are also provided. SGLG selectively groups and ungroups histogram components to achieve specific application purposes, such as eliminating background noise, enhancing a specific segment of the histogram, and so on. GLG techniques may be applied to both monochromatic grayscale images and to color images. Several preprocessing or postprocessing methods for image noise reduction are provided for use independently or for use with GLG techniques to both reduce or eliminate background noise and enhance the image contrast in noisy low-contrast images.

19 Claims, 30 Drawing Sheets

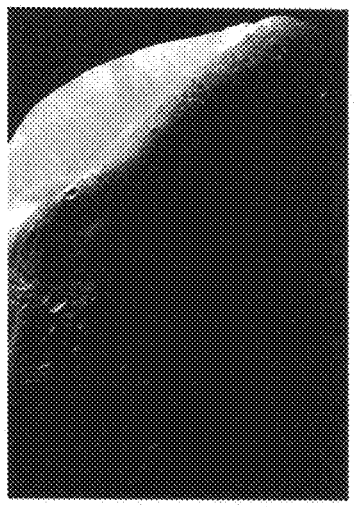
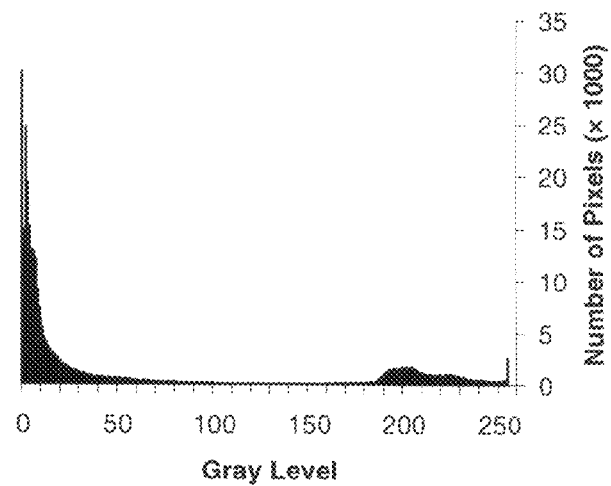
Figure 1A
Figure 1B
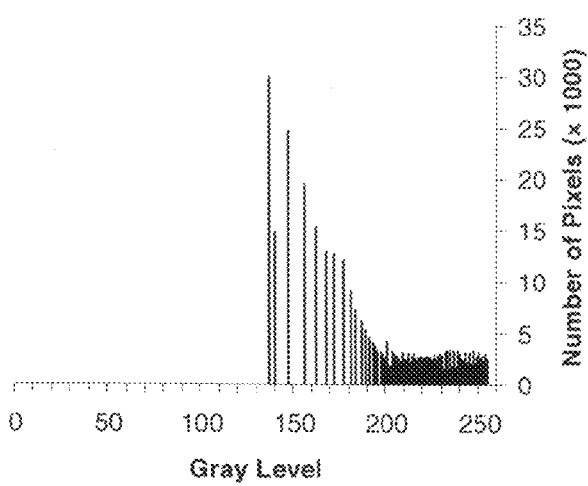
Figure 2A
Figure 2B

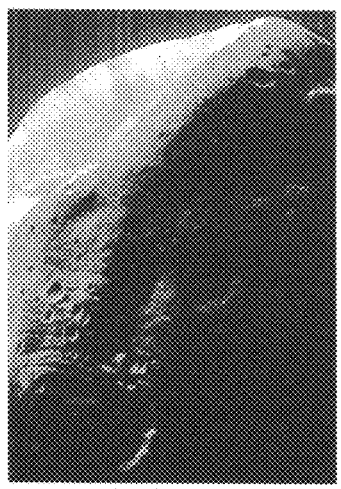
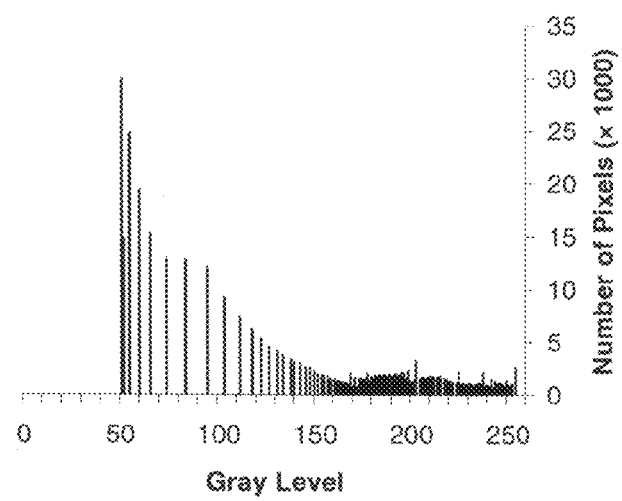
Figure 3A
Figure 3B
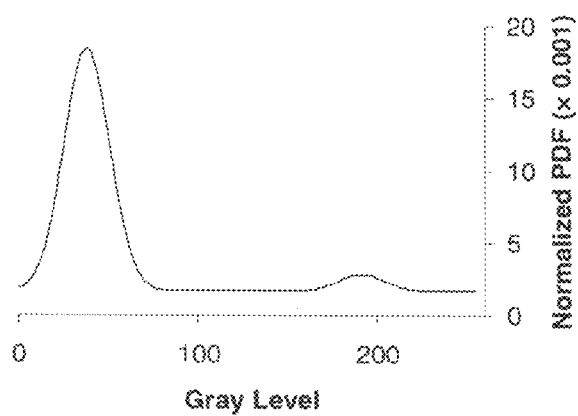
Figure 3C

 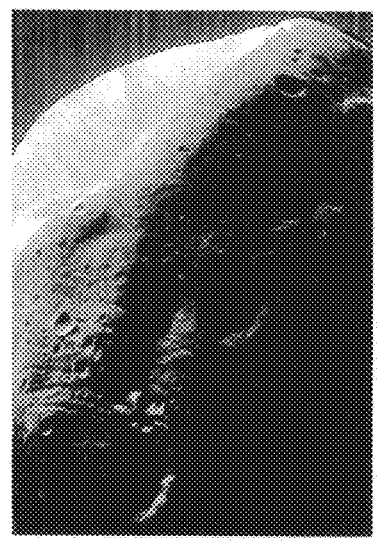
Figure 9A Figure 9B
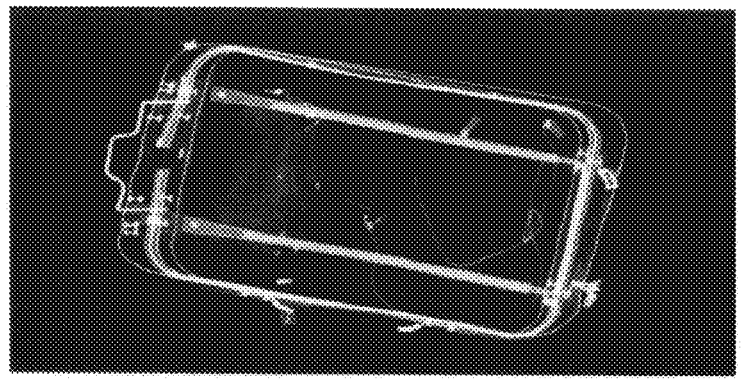
Figure 10A
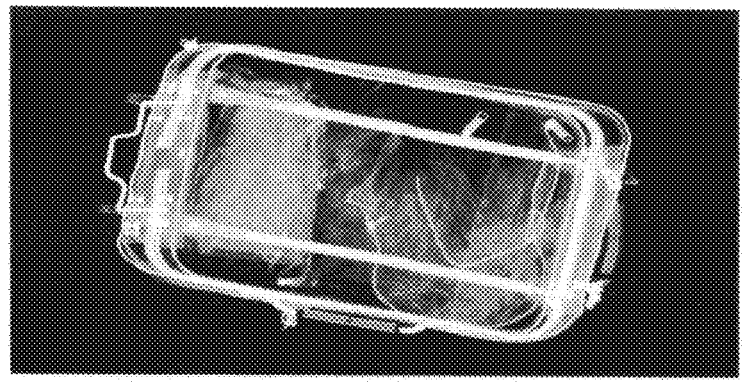
Figure 10B

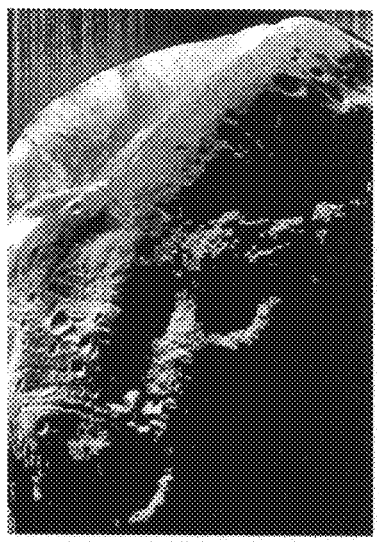
Figure 11A    Figure 11B
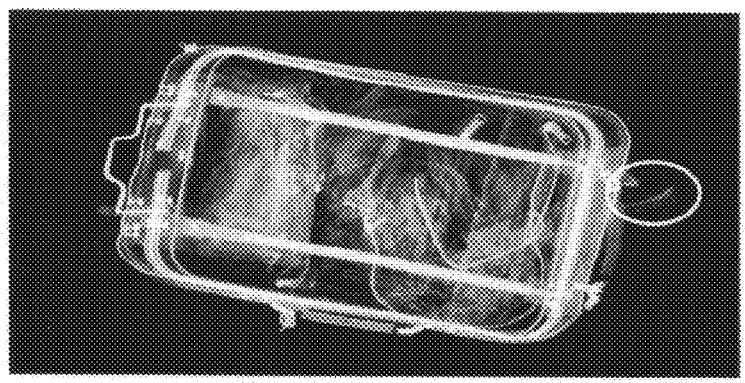
Figure 12A
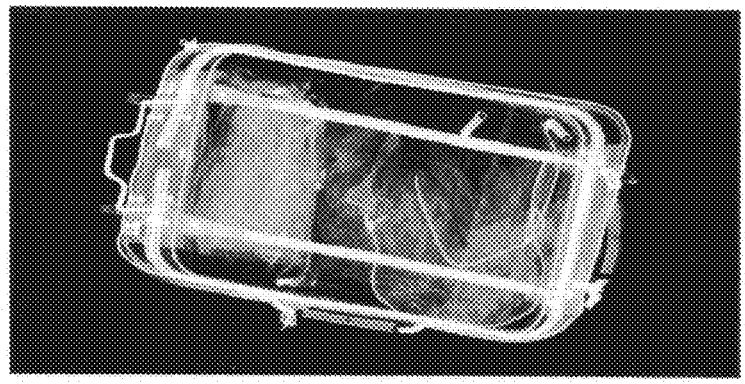
Figure 12B

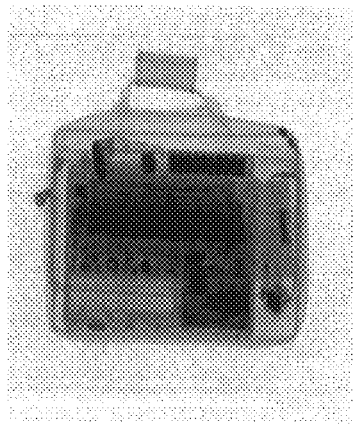
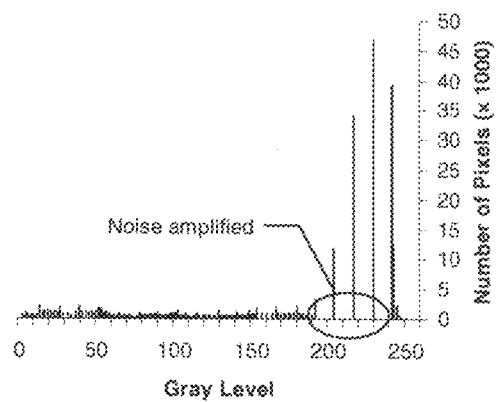
Figure 15A
Figure 15B
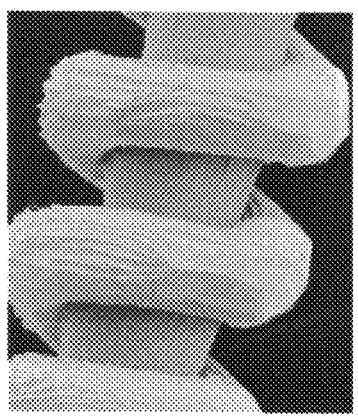
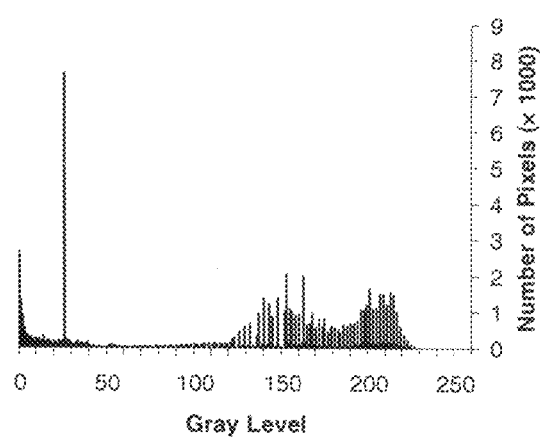
Figure 16A
Figure 16B

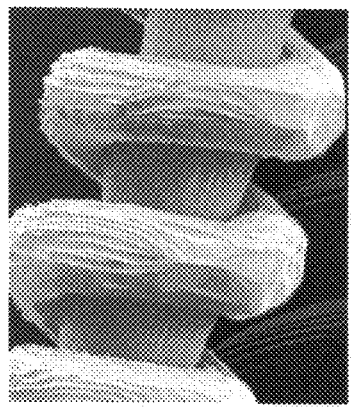 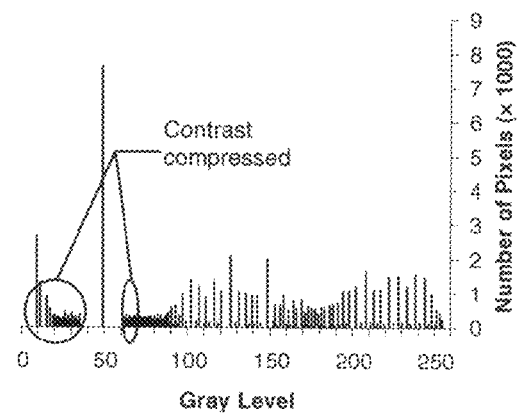
Figure 17A  Figure 17B
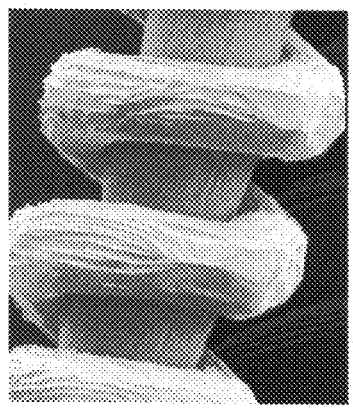 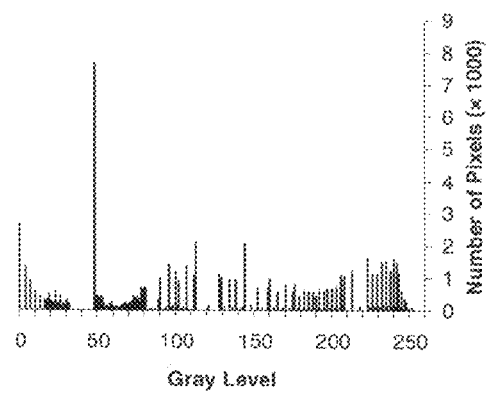
Figure 18A  Figure 18B

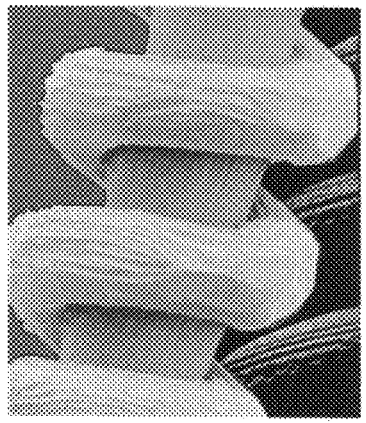 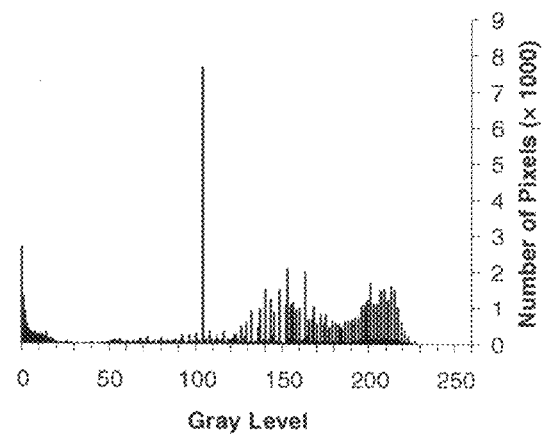
Figure 19A　　　　Figure 19B
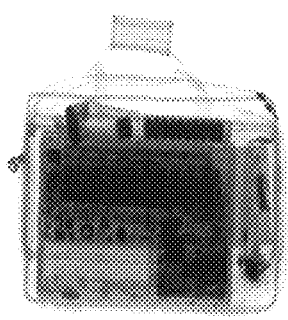 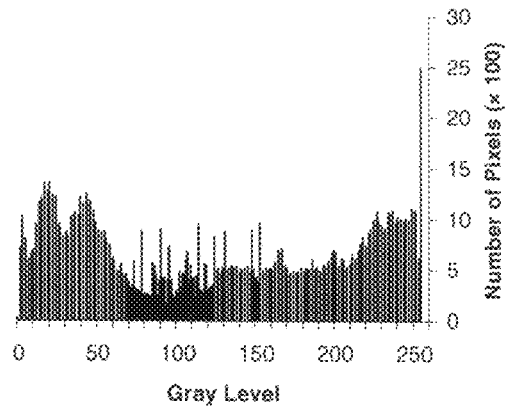
Figure 20A　　　　Figure 20B

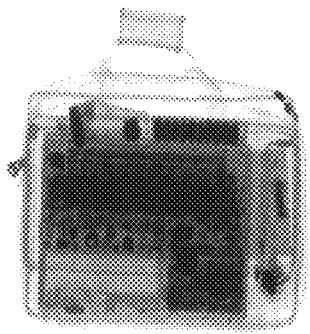 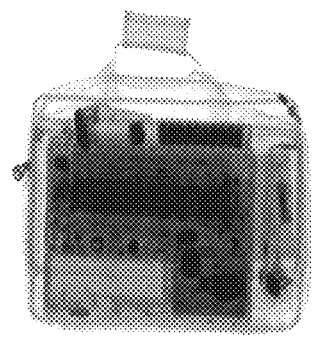
Figure 21A　　　　　　　　Figure 21B
 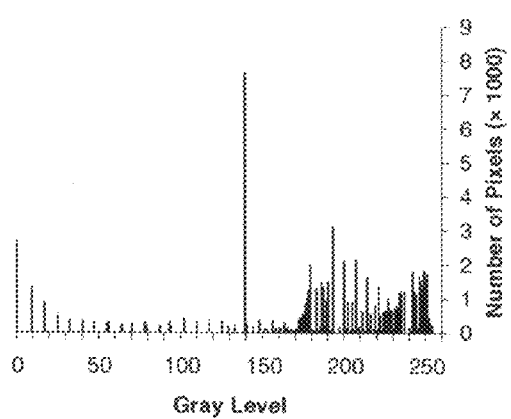
Figure 22A　　　　　　　　Figure 22B

METHOD OF ENHANCING A DIGITAL IMAGE BY GRAY-LEVEL GROUPING

CROSS REFERENCES TO RELATED APPLICATIONS

This patent application claims priority from and is related to U.S. Provisional Patent Application Ser. No. 60/736,907 filed Nov. 15, 2005, entitled: Method of Enhancing a Digital Image by Gray-level Grouping. This U.S. Provisional Patent Application is incorporated by reference in its entirety herein.

FIELD

This invention relates to the field of digital image enhancement. More particularly, this invention relates to the improvement of contrast in digital images.

BACKGROUND

Contrast enhancement has an important role in image processing applications. Various contrast enhancement techniques have been described in the literature, such as (a) gray-level transformation based techniques (e.g., logarithm transformation, power-law transformation, piecewise-linear transformation, etc.) and (b) histogram processing techniques (e.g., histogram equalization (HE), histogram specification, etc.) Conventional contrast enhancement techniques may yield acceptable results if the proper technique is selected for a given application along with the proper processing parameters. However, conventional contrast enhancement techniques often fail in producing satisfactory results for a broad range of low-contrast images, such as images characterized by the fact that the amplitudes of their histogram components are very high at one or several locations on the grayscale, while they are very small, but, not zero, in the rest of the grayscale. This makes it difficult to increase the image contrast by simply stretching its histogram or by using simple gray-level transformations. The high amplitude of the histogram components corresponding to the image background also often prevents the use of the histogram equalization techniques, which could cause a washed-out effect on the appearance of the output image and/or amplify the background noise. FIG. 1A illustrates an example of a low-contrast image and FIGS. 2A and 3A illustrate the results of treating that image with conventional contrast enhancement techniques.

FIG. 1A shows an original low-contrast image of the Mars moon, Phobos. The histogram of gray-level values of the image in FIG. 1A is presented in FIG. 1B. FIG. 2A depicts the results of the application of a conventional histogram equalization image processing technique to the image of FIG. 1A. FIG. 2A exhibits a washed-out appearance which is not acceptable for many applications. The cause of the washed-out appearance is that the left half of the grayscale on the histogram of the equalized image is simply empty, as shown in FIG. 2B.

FIG. 3A illustrates the results of the application of a conventional histogram specification image processing technique applied to the image of FIG. 1A. FIG. 3B presents the gray level histogram of the image in FIG. 3A, (which is better than the histogram equalization result FIG. 2A), but still has an unsatisfactory appearance. More importantly, one major disadvantage of the histogram specification technique is that the desired histogram of the result image has to be specified manually, and this precludes the technique from being applied automatically. The manually specified desired histogram used in the treatment is depicted in FIG. 3C.

Various other histogram-based contrast enhancement techniques have been developed, but most of them are derivatives of the previously-noted conventional techniques such as bi-histogram equalization, block-overlapped histogram equalization, multi-scale adaptive histogram equalization, shape preserving local histogram modification, and so on. The mean brightness of histogram-equalized image is always the middle gray-level regardless of the input mean, and this is undesirable in certain applications where brightness preservation is necessary. This characteristic of HE may also lead to a washed-out appearance, amplified noise or other annoying artifacts in the resulting image. Bi-histogram equalization (BHE) was proposed to preserve the brightness by separating the input image's histogram into two parts based on its mean—one ranges from the minimum gray-level value to the mean gray level, the other from the mean to the maximum. The two histograms are then equalized independently. Equal Area Dualistic Sub-Image Histogram Equalization (DSIHE) is similar to BHE except that DSIHE separates the histogram at the median gray-level value—the gray-level value with cumulative probability equal to 0.5 instead of the mean. These two techniques usually outperform the basic histogram equalization (HE) technique. However, they have the same limitations of HE and cannot enhance some images well, as they still perform the HE operation in each grayscale segment, just limiting the drawbacks of HE within each grayscale segment.

Global histogram equalization methods have also been developed, but typically they cannot adapt to local brightness features of the input image because it uses histogram information over the whole image. This fact limits the contrast-stretching ratio in some parts of the image, and causes significant contrast losses in the background and other small regions. To overcome this limitation, some local histogram-equalization methods have been developed. A natural extension of global histogram equalization is referred to as adaptive histogram equalization (AHE), which divides the input image into an array of sub-images, each sub-image is histogram-equalized independently, and then the processed sub-images are fused together with bilinear interpolation.

Another local method is called block-overlapped histogram equalization, in which a rectangular sub-image of the input image is first defined, a histogram of that block is obtained, and then its histogram-equalization function is determined. Thereafter, the center pixel of the block is histogram equalized using this function. The center of the rectangular block is then moved to the adjacent pixel and the histogram equalization is repeated. This procedure is repeated pixel by pixel for all input pixels. Since local histogram equalization is generally performed for all pixels in the entire image, the computation complexity of this method is very high. Instead of using rectangular blocks, shape preserving local histogram modification employs connected components and level-sets for contrast enhancement. Multi-scale adaptive histogram equalization and other multi-scale contrast enhancement techniques use multi-scale analysis to decompose the image into sub-bands, and apply corresponding enhancement techniques to the high-frequency sub-band, and then combine the enhanced high-frequency sub-band with the low-frequency sub-band to reconstruct the output image.

Some of the advanced contrast enhancement techniques described above may outperform simpler techniques. However, they still have limitations and cannot handle certain classes of images well and/or are not fully automatic methods. What are needed therefore are improved techniques for image enhancement that cover broader ranges of image problems and that may be implemented as automated processes.

SUMMARY

The present invention provides a method embodiment for enhancing the quality of at least a portion of an electronic image having a plurality of original image components, where each original image component has one of a plurality of original gray-level values that are distributed over a grayscale. This method embodiment begins with establishing a first histogram of the gray-level values over the grayscale. The gray-level values are then grouped into a second histogram having a number of bins that optimizes an image quality criterion. Each bin contains a subset of the original image components of the at least a portion of the electronic image. The method proceeds with redistributing at least a portion of the bins over the grayscale to produce redistributed image components having a redistributed gray level established by the redistributing. The method concludes by ungrouping the redistributed image components from each bin to establish enhanced image components having an enhanced gray level to produce an enhanced electronic image.

A method embodiment provides for enhancing the quality of at least a portion of an electronic color image comprising a plurality of original image components. Each original image component has at least two original color spectral constituents, and each original color spectral constituent has one of a plurality of gray-level values that are distributed over a grayscale. This method embodiment begins with applying to each color spectral constituent an image enhancement method. The image enhancement method begins by establishing a first histogram of the gray-level values over the grayscale for the color spectral constituent. The image enhancement method continues with grouping the gray-level values for the color spectral constituent into a second histogram having a proper number of bins according to a criterion that establishes a quantitative measure of image enhancement. Each bin contains a subset of the original image color spectral components of the at least a portion of the electronic color image. Next, the bins are redistributed over the grayscale. The image enhancement method concluded with deriving a gray level transformation function and ungrouping the subset of original image components from each bin according to the transformation function to produce an enhanced color spectral constituent. The method embodiment for enhancing the quality of at least a portion of an electronic image continues with identifying the color spectral constituent that has the best quantitative measure of image enhancement, and then applying to each original color constituent the gray level transformation function for the color spectral component having the best quality enhancement measure, to each original color constituent thereby creating enhanced color constituents each having enhanced image component. The method embodiment for enhancing the quality of at least a portion of an electronic color image concludes with combining the enhanced color constituents to produce an enhanced electronic color image.

A method embodiment is provided for enhancing the quality of at least a portion of an electronic color image having a plurality of original image components, where each original image component has a hue value, a saturation value, and an intensity value, and where the intensity value has one of a plurality of intensity values distributed over an intensity range. This method embodiment begins with applying an image enhancement method to the intensity values of the image components. The image enhancement method begins by establishing a first histogram of the intensity values over the intensity range, and then grouping the intensity values into a second histogram having a proper number of bins according to a criterion that establishes a quantitative measure of image enhancement. Each bin contains a subset of the original image components of the at least a portion of the electronic image. The image enhancement method continues with redistributing the bins over the intensity range, and then deriving an intensity transformation function and ungrouping the subset of original image components from each bin according to the transformation function to produce an enhanced intensity value for each image component. The method embodiment is provided for enhancing the quality of at least a portion of an electronic color image concludes with combining the enhanced intensity value with the hue value and the saturation value for each original image component to produce enhanced image components in an enhanced electronic color image.

A method for producing an enhanced electronic image is provided. The method begins with generating a fused image from a plurality of source images. The method proceeds with applying an image enhancement process to the fused image. The image enhancement process may include noise removal by background subtraction, noise removal by statistical subtraction, or contrast enhancement by gray-level grouping. In some embodiments of the method for producing an enhanced electronic image the process for generating a fused image from a plurality of source images includes the steps of (1) generating a plurality of geometrically-registered source images, (2) using a discrete wavelet transform to derive wavelet coefficients for each source image, (3) using a fusion rule to derive fused wavelet coefficients from the wavelet coefficients of the source images, and (4) applying an inverse discrete wavelet transform to the wavelet coefficients to generate a fused image. In some embodiments the process of noise removal by background subtraction begins with a step of establishing a noisy histogram $H_B(k)$ of a plurality of noisy image components selected from the original image components over a noisy portion of the electronic image, where each noisy image component has a noisy gray-level value (k), and the process of noise removal by background subtraction concludes with rescaling the noisy histogram $H_B(k)$ and subtracting the rescaled noisy histogram from the first histogram to yield a de-noised first histogram H(k) according to the equation $$H(k) = \begin{cases} 0, & \text{if } H_I(k) - \frac{N_I}{N_B}\beta \cdot H_B(k) < 0 \\ H_I(k) - \frac{N_I}{N_B}\beta \cdot H_B(k), & \text{otherwise} \end{cases}$$

for k=0, 1, . . . , M−1.

where $H_I(k)$ is the first histogram, $N_I$ is the number of the original image components, $N_B$ is the number of the noisy image components, and β is a coefficient that scales the amplitude of $H_B(k)$ to approximately the amplitude of $H_I(k)$. In some embodiments of the method for producing an enhanced digital image, the process of noise removal by statistical averaging includes establishing an iteration count equal to one and defining a noisy grayscale range within the first histogram, and defining a set of noisy image components within the noisy range of the first histogram. The process of noise removal by statistical averaging continues with analyzing the set of noisy original image components to determine an original noise statistical central tendency and an original noise statistical variance. The process then proceeds with creating an artificial image that has a plurality of artificial image components that are spatially equivalent and equal in number to the set of the original image components, where each artificial image component has a gray-level value equal to the original noise statistical central tendency. The artificial image is then corrupted by an artificial noise to create noisy artificial image components that each has a noisy artificial image component gray level. Further, the noisy artificial image components have an artificial noise statistical central tendency that is equal to the original noise statistical central tendency and an artificial noise statistical variance that equal to the original noise statistical variance. The process of noise removal by statistical averaging then continues by combining the noisy artificial image components and the original image components to create an intermediate image having a set of corresponding intermediate image components that includes a set of noisy intermediate image components within the noisy grayscale range of the first histogram. The combining step proceeds as follows. If the gray-level value of an image component in the set of original image components is within the noisy range of the histogram, the gray-level value of the corresponding intermediate image component is established by adding the gray-level value of the original image component to the gray-level value of the corresponding noisy artificial component. If the gray-level value of an image component in the set of original image components is outside the noisy range of the histogram, the gray-level value of the corresponding intermediate image component is established by doubling the gray-level value of the original image component. The process of noise removal by statistical averaging then concludes by dividing the gray-level values of the intermediate image components by one more than the iteration count to create a de-noised image.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 1A is a low-contrast image of Mars' moon Phobos;

FIG. 1B is the gray-level histogram of image components in the image of Phobos of FIG. 1A;

FIG. 2A is the image of FIG. 1A processed by a histogram equalization technique;

FIG. 2B is the gray-level histogram of image components in the image of FIG. 2A;

FIG. 3A is the image of FIG. 1A processed by a histogram specification technique;

FIG. 3B is the gray-level histogram of image components in the image of FIG. 3A;

FIG. 3C is the manually specified histogram profile used to produce the histogram specification result in FIG. 3B;

FIG. 9A is the image of FIG. 1A processed according to a gray-level grouping process with an optimal number of bins that the process found to be four in number;

FIG. 9B is the image of FIG. 1A processed according to a gray-level grouping process using a default value of 20 bins;

FIG. 10A is an x-ray image of a piece of luggage;

FIG. 10B is an enhancement of the image of FIG. 10A produced by a gray-level grouping process;

FIG. 11A is an enhancement of the image of FIG. 1A produced by adaptive gray-level grouping (A-GLG);

FIG. 11B is an enhancement of the image of FIG. 1A produced by global gray-level grouping. It is the same as FIGS. 7A and 9A and reproduced here for convenience of comparison with FIG. 11A;

FIG. 12A is an enhancement of the image of FIG. 10A produced by an adaptive gray-level grouping process;

FIG. 12B is the same as FIG. 10B, reproduced in proximity to FIG. 12A for ease of comparison;

FIG. 15A is an enhancement of the image of FIG. 14A produced by a fast gray-level grouping (FGLG) process;

FIG. 15B is the gray-level histogram of image components in the image of FIG. 15A;

FIG. 16A is a low-contrast scanning electron microscope image of tungsten filaments and supports;

FIG. 16B is the gray-level histogram of image components in the image of FIG. 16A;

FIG. 17A is a modification of the image of FIG. 16A produced by histogram equalization (HE);

FIG. 17B is the gray-level histogram of image components in the image of FIG. 17A;

FIG. 18A is an enhancement of the image of FIG. 16A produced by a basic gray-level grouping (GLG) process;

FIG. 18B is the gray-level histogram of image components in the image of FIG. 18A;

FIG. 19A is a modification of the image of FIG. 16A produced by using histogram statistics;

FIG. 19B is the gray-level histogram of image components in the image of FIG. 19A;

FIG. 20A is an enhancement of the image of FIG. 13A produced by a selective gray-level grouping (SGLG) process;

FIG. 20B is the gray-level histogram of image components in the image of FIG. 20A;

FIG. 21A is the image of FIG. 13A processed according to an optimized gray-level grouping process with an optimal number of bins that the process found to be 149 in number;

FIG. 21B is an enhancement of the image of FIG. 13A produced by a fast gray-level grouping (FGLG) process using a default number of 20 bins;

FIG. 22A is an enhancement of the image of FIG. 16A produced by a selective gray-level grouping (SGLG) process;

FIG. 22B is the gray-level histogram of image components in the image of FIG. 22A;

FIG. 37D is an arithmetic average of FIGS. 38A and 37B;

Figure 45:
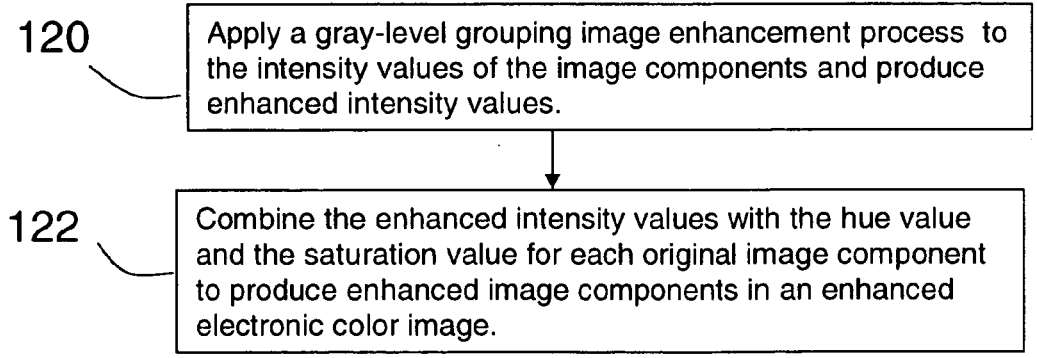
Figure 46:
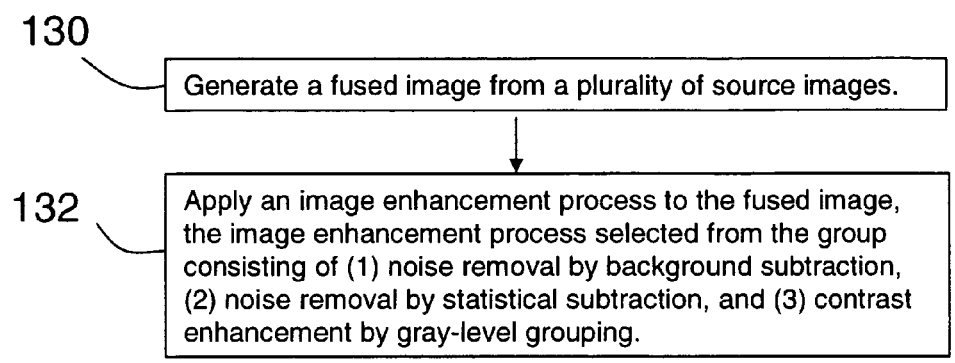

FIG. 45 presents a flow chart of a second method embodiment for enhancing the quality of an electronic color image; and FIG. 46 illustrates a method embodiment for producing an enhanced electronic image.

DETAILED DESCRIPTION

In the following detailed description of the preferred embodiments, reference is made to the accompanying drawings, which form a part hereof, and within which are shown by way of illustration specific embodiments of methods for enhancing the quality of a digital image. It is to be understood that other embodiments may be utilized, and that structural changes may be made and processes may vary in other embodiments.

Figure 4A:
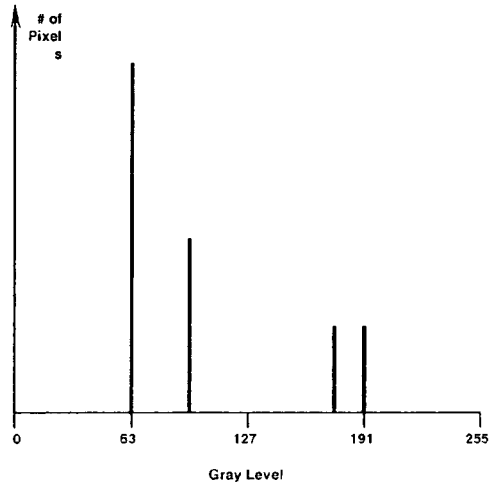
FIG. 4A is the histograms of a virtual low-contrast image.
Figure 4B:
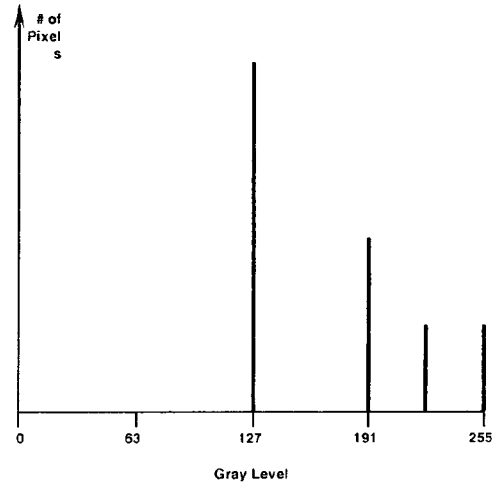
FIGS. 4B, 4C, and 4D are histograms of images resulting from the treatment of the virtual image histogram of FIG. 4A using various enhancement methods.

One measure of image quality is image contrast. FIGS. 4A-4D illustrate some of the principles of image contrast enhancement. FIG. 4A illustrates the histogram of a virtual low-contrast image. The histogram contains four components, which are clustered in the central part of the grayscale. The amplitude of the second component is half that of the leftmost component, and the right two components are half the second one. FIG. 4B shows the result of performing histogram equalization on the histogram of FIG. 4A. Due to the highest amplitude of the leftmost component, the resulting histogram is shifted toward the right side of the grayscale. The left half of the grayscale is empty and this produces a washed-out appearance in the output image. The objective of histogram equalization is to achieve a uniform histogram. However, this can be achieved only on continuous histograms. For digital images and their discrete histograms, histogram equalization simply cannot redistribute the histogram components uniformly in most cases, because of the continuous nature of the technique.

Figure 4C:
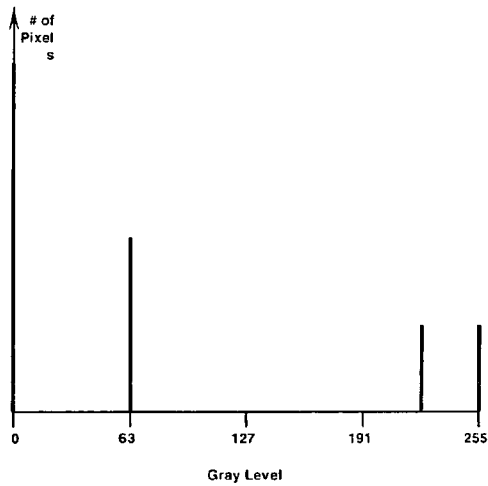

FIG. 4C shows the result of performing a linear contrast stretch on the histogram of FIG. 4A. The resulting histogram spreads over the full range of grayscale, so there is no washed-out appearance in the output image. However, it can be noted that the right two histogram components are still quite close to each other, so are the left two. As a result, the contrast enhancement in some regions of the output image is not the strongest. Since the left two histogram components are far away from the right two, they might be over-contrasted in the output image. Therefore, the contrast enhancement in the resulting image might also be unbalanced. Furthermore, linear contrast stretch is generally not an automatic method, since a piecewise-linear transformation function need to be manually specified to achieve satisfactory results.

Figure 4D:
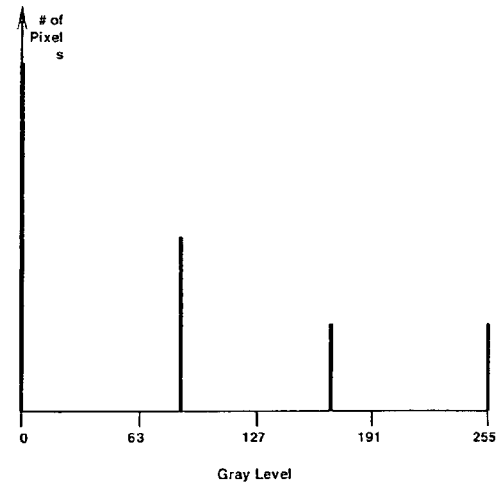

In order to overcome the shortcomings of the corrective techniques illustrated in FIGS. 4B and 4C, the components of the desired histogram of the optimal contrast enhancement result should spread over the full range of the grayscale, with the bins being away from each other as far as possible. FIG. 4D shows the desired histogram which produces the strongest contrast enhancement. It can be noted that the four histogram components are uniformly spread over the entire grayscale, and are evenly spaced from each other.

In summary, various objectives of contrast enhancement may include the following:

i. Achieve a uniform histogram, but for discrete histograms, in the sense that the histogram components are redistributed uniformly over the grayscale.

ii. Utilize the grayscale more efficiently. Conventional contrast enhancement techniques such as histogram equalization are likely to leave too much empty space on the grayscale and cause under or over-contrast.

iii. Spread the components of histogram over the grayscale in a controllable and/or efficient way.

iv. Treat the histogram components in different parts of the grayscale differently if necessary, in order to satisfy specific contrast enhancement purposes.

v. The techniques are general (not image-dependent), and are able to treat various kinds of images automatically.

To achieve some or all of these various objectives, many of the embodiments described herein employ some or all of the following process steps.

i) Group the histogram components of an image into a proper number of gray level bins according to their amplitudes, in order to initially reduce the number of gray-level bins. Therefore, empty gray levels may be created on the grayscale, allowing the redistribution of the histogram components in the next step. Furthermore, this grouping operation typically results in a set of gray level bins whose amplitudes are close to each other, allowing a quasi-uniform distribution of the histogram components in the next step.

ii) Redistribute these groups of histogram components uniformly over the grayscale, so that each group occupies a grayscale segment of the same size as the other groups, and the concentrated histogram components spread out and image contrast is increased. The size of the grayscale segment occupied by one gray level bin is determined from the total number of bins. At the same time, the grayscale is utilized efficiently and the over-contrast problem is also avoided.

iii) The histogram components in different segments of the grayscale can be grouped to using different criteria, so they can be redistributed differently over the grayscale to meet specific processing purposes, e.g., certain applications may require different parts of the histogram to be enhanced to different extents.

The algorithm of one basic GLG technique is described as follows, along with a simple example for illustration:

Step 1

Let $H_n(k)$ denote the histogram of the original image, with k representing the gray-level values on the grayscale [0, M−1]. To perform gray-level grouping, first the n non zero histogram components are assigned to gray level bins, or gray level groups, $G_n(i)$.

$$G_n(i)=H_n(k) \text{ for } H_n(k) \neq 0, k=0, 1, 2, \ldots, M-1; i=1, 2, 3, \ldots, n. \quad (1)$$

Figure 5A:
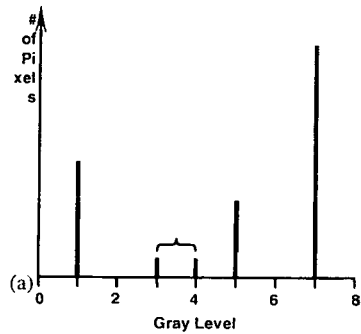
FIG. 5A is the histogram of an original virtual low-contrast image.

FIG. 5A illustrates the histogram of a virtual low-contrast image, whose gray-level values are in the interval [0, 8]. It has n=5 nonzero components and its histogram components are, $H_5(1)=6, H_5(3)=H_5(4)=1, H_5(5)=4,$
$H_5(7)=12,$ and $H_5(k)=0$ for $k=0, 2, 6, 8$.

After the nonzero histogram components are assigned to gray level bins, we have $G_5(1)=6, G_5(2)=1, G_5(3)=1, G_5(4)=4,$ and $G_5(5)=12$.

Step 2

The left and right limits, $L_n(i)$ and $R_n(i)$, of the gray level interval represented by $G_n(i)$ also need to be recorded. In this first step, the intervals consist of single values, which are the gray-level values, k, of the original histogram components, $H_n(k)$.

$$L_n(i)=R_n(i)=k, \text{ for } H_n(k) \neq 0, k=0, 1, 2, \ldots, M-1, i=1, 2, 3, \ldots, n. \quad (2)$$

In this example, these parameters are
$L_5(1)=R_5(1)=1; L_5(2)=R_5(2)=3; L_5(3)=R_5(3)=4;$
$L_5(4)=R_5(4)=5; L_5(5)=R_5(5)=7.$ Step 3

The first occurring smallest $G_n(i)$ is found.

$$a = \min_i G_n(i), \quad (3)$$

and $i_a$ is the group index corresponding to the smallest $G_n(i)$, i.e., a. In our example, $i_a=2$, and $a=G_5(2)=1$.

Step 4

Grouping is performed in this step. Group $G_n(i_a)$ is merged with the smaller of its two adjacent neighbors, and the gray level bins $G_n(i)$ adjusted to create a new set of bins, $G_{n-1}(i)$, as follows.

$$G_{n-1}(i) = \begin{cases} G_n(i) & \text{for } i = 1, 2, \ldots, i'-1 \\ a+b & \text{for } i = i' \\ G_n(i+1) & \text{for } i = i'+1, i'+2, \ldots, n-1 \end{cases} \quad (4)$$

where $$b = \min\{G_n(i_a-1), G_n(i_a-1)\} \quad (5)$$

and $$i' = \begin{cases} i_a - 1 & \text{for } G_n(i_a - 1) \leq G_n(i_a + 1) \\ i_a & \text{otherwise} \end{cases} \quad (6)$$

The left and right limits of the gray level intervals represented by $G_{n-1}(i)$ also need to be adjusted accordingly.

$$L_{n-1}(i) = \begin{cases} L_n(i) & \text{for } i = 1, 2, \ldots, i' \\ L_n(i+1) & \text{for } i = i'+1, i'+2, \ldots, n-1 \end{cases} \quad (7)$$

$$R_{n-1}(i) = \begin{cases} R_n(i) & \text{for } i = 1, 2, \ldots, i'-1 \\ R_n(i+1) & \text{for } i = i', i'+1, \ldots, n-1 \end{cases} \quad (8)$$

In this example, $b=G_5(3)=1$, and $i'=i_a=2$. The bracket in FIG. 5A indicates the two histogram components to be grouped. The new gray-level bins are, $G_4(1)=G_5(1)=6, G_4(2)=a+b=2,$
$G_4(3)=G_5(4)=4,$ and $G_4(4)=G_5(5)=12.$ The new gray level intervals represented by the new groups are, $L_4(1)=R_4(1)=1; L_4(2)=3, R_4(2)=4;$
$L_4(3)=R_4(3)=5; L_4(4)=R_4(4)=7.$ Step 5

Mapping and ungrouping are performed in this step. Now the total number of gray-level bins has been reduced by one. The construction of the transformation function $T_{n-1}(k)$ may be started, which maps the gray-level values of components (e.g., pixels) in the input image to the desired values in the output image. In this method, all gray level bins are redistributed uniformly over the entire grayscale, the gray-level values are mapped to new values, and the combined histogram components are fully or partially uncombined. First the number of gray-level values, $N_{n-1}$, that each gray-level bin will occupy in the resulting image is calculated. With a total number of bins equal to n−1, we have $$N_{n-1} = \frac{M-1}{n-1}. \quad (9)$$

However, if $L_{n-1}(1)=R_{n-1}(1)$, this indicates that the leftmost gray level bin $G_{n-1}(1)$ contains only one gray level or one histogram component, which usually corresponds to the background, and it will be matched to gray level 0 in the resulting image. To prevent this one histogram component from occupying too many gray levels, we let $$N_{n-1} = \frac{M-1}{n-1-\alpha}, \quad (10)$$

where α is a constant between 0 and 1, and usually assumes a value of 0.8 in our treatments, found through multiple trials to work well with a variety of images.

There are four cases to be considered when constructing $T_{n-1}(k)$. For $k=0, 1, 2, \ldots, M-1$:

i) If gray level k falls inside gray-level bin $G_{n-1}(i)$, and $L_{n-1}(i) \neq R_{n-1}(i)$, this gray level is first mapped onto the right boundary of the gray level interval assigned to bin $G_{n-1}(i)$, i.e., $[(i-1)N_{n-1}, iN_{N-1}]$, then it is separated from the group by linear rescaling within the assigned gray level interval. Therefore, its transformation function $T_{n-1}(k)$ is $$T_{n-1}(k) = \begin{cases} \left(i - \alpha - \frac{R_{n-1}(i)-k}{R_{n-1}(i)-L_{n-1}(i)}\right)N_{n-1} + 1, \\ \quad \text{for } L_{n-1}(1) = R_{n-1}(1) \\ \left(i - \frac{R_{n-1}(i)-k}{R_{n-1}(i)-L_{n-1}(i)}\right)N_{n-1} + 1, \\ \quad \text{for } L_{n-1}(1) \neq R_{n-1}(1) \end{cases} \quad (11)$$

If $L_{n-1}(1)=R_{n-1}(1)$, constant α prevents the background histogram from occupying too many gray levels.

If $L_{n-1}(i)=R_{n-1}(i)$, i.e., the bin $G_{n-1}(i)$ contains only one gray level, then the transformation function is $$T_{n-1}(k) = \begin{cases} (i-\alpha)N_{n-1}, & \text{for } L_{n-1}(1) = R_{n-1}(1) \\ iN_{n-1}, & \text{for } L_{n-1}(1) \neq R_{n-1}(1) \end{cases} \quad (12)$$

ii) If gray level k falls between gray-level bin $G_{n-1}(i)$ and $G_{n-1}(i+1)$, then its transformation function is $$T_{n-1}(k) = \begin{cases} (i-\alpha)N_{n-1}, & \text{for } L_{n-1}(1) = R_{n-1}(1) \\ iN_{n-1}, & \text{for } L_{n-1}(1) \neq R_{n-1}(1) \end{cases} \quad (13)$$

This ensures that $T_{n-1}(k)$ is monotonically increasing along the grayscale, and the gray level reversal problem will be avoided in the adaptive approach of the GLG method.

iii) If $k \leq L_{n-1}(1)$, then $T_{n-1}(k)=0$; (14)

iv) If $k \geq R_{n-1}(n-1)$, then $T_{n-1}(k)=M-1$. (15)

The constructed gray-level transformation function, $T_{n-1}(k)$ for k=0, 1, 2, . . . , M-1, is stored in computer memory. In the present example, let $\alpha=1$ for simplicity and set $N_4=(9-1)/(4-1)=2.67$. The transformed gray levels are
$T_4(0)=T_4(1)=T_4(2)=0$, $T_4(3)=1$, $T_4(4)=3$,
$T_4(5)=5$, $T_4(6)=5$, $T_4(7)=T_4(8)=8$.

Figure 5B:
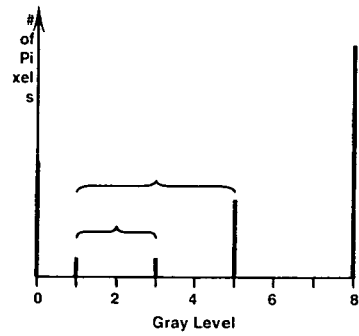
FIG. 5B is the histogram of the virtual image corresponding to FIG. 5A after a first gray-level grouping and ungrouping.

All resulting gray levels are rounded to the closest integer, and the histogram of the resulting image is shown in FIG. 5B.

Step 6

By applying the constructed transformation function $T_{n-1}(k)$ to the histogram, $H_n(k)$, of the original image, we obtain the histogram of the processed image, $H_{n-1}(k)$. The average distance, $D_{n-1}$, between components (e.g., pixels) on the grayscale, is used as a criterion to measure the quality of contrast enhancement. This distance is given by the expression below:

$$D_{n-1} = \frac{1}{N_{pix}(N_{pix}-1)} \sum_{i=0}^{M-2} \sum_{j=i+1}^{M-1} H_{n-1}(i)H_{n-1}(j)(j-1), \quad (16)$$

$$\text{for } i, j \in [0, M-1]$$

where [0, M–1] is the gray level range of the grayscale, and $N_{pix}$ is the total number of pixels in the image. This criterion generally applies only to the gray-level grouping technique or similar histogram-based techniques, and is generally not used to judge the quality of images treated by other enhancement techniques.

A counter example is given here—If the mean gray level of a low-contrast image is set as the threshold, and the image is converted into a black-and-white image, the average distance between pixels on the grayscale of the resulting image will be the maximum that could be achieved theoretically. However, the resulting black-and-white image is obviously unacceptable for purposes of enhancement. The GLG process tends to spread the histogram components uniformly over the grayscale, preventing the histogram components from concentrating in particular locations on the grayscale. At the same time, a larger D will keep the histogram components further away from each other for better enhancement. Therefore, the average distance between pixels on the grayscale, D, provides a sound measure of the quality of images enhanced by the GLG technique, and it is considered that the maximal D corresponds to the optimal contrast enhancement. Visual evaluations of multiple images during testing also confirm the validity of this measure. A quantified optimization of contrast enhancement is desired in the GLG process to achieve the optimal result, and maximizing the average distance between pixels on the grayscale is a very good quantified optimization of contrast in an image. It is worth noting that this image contrast criterion is not limited to the GLG algorithm, but may also be used in other histogram-based algorithms (especially histogram equalization) as well. However, it is suggested that this criterion be used with caution with such conventional methods since results may be somewhat unpredictable.

In some cases (e.g., images where the background occupies a large percentage area in the image), in order to achieve the optimal result, the gray levels corresponding to the image background may be excluded when calculating $D_{n-1}$. For many images, the histogram components corresponding to the background are the highest and distinct in the histogram profile. Therefore, the approximate area of the background may be calculated automatically by summing the amplitudes of the histogram components of the background when the user designates the input image as having a large-area background. If the background occupies a percentage area in the image larger than a user specified threshold (e.g., 40%), the background gray levels may then be excluded when calculating $D_{n-1}$. In the present example, $D_5$ of FIG. 5A is 1.36, and $D_4$ of FIG. 5B is 1.87.

To determine the optimal number of gray level bins that will lead to the optimal contrast enhancement, the above procedure is repeated to group the histogram components into all possible numbers from n to 2. (There is no need to group all histogram components into one bin since the histogram will be the same as the original after it is ungrouped.) The average distance between pixels on the grayscale, $D_i$, is calculated for each set of bins. The maximal $D_i$ will lead to the corresponding optimum number, $i_{opt}$, for gray-level bins.

$$D_{max} = \max_i D_i, \quad \text{for } i = n, n-1, n-2, \ldots, 2 \quad (17)$$

$$i_{opt}=i, \text{ for } D_i=D_{max}. \quad (18)$$

In the present example, the grouping of the gray-level bins continues. This time bin $G_4(2)$ and $G_4(3)$ are grouped as indicated by the bracket in FIG. 5B, and the new set of gray-level bins are
$G_3(1)=G_4(1)=6$, $G_3(2)=G_4(2)+G_4(3)=2+4=6$,
and $G_3(3)=G_4(4)=12$.
Their boundaries are
$L_3(1)=R_3(1)=1$; $L_3(2)=3$, $R_3(2)=5$; $L_3(3)=R_3(3)=7$. Then $N_3=8/(3-1)=4$, and the new transformed gray levels are
$T_3(0)=T_3(1)=T_3(2)=0$, $T_3(3)=1$, $T_3(4)=3$,
$T_3(5)=4$, $T_3(6)=4$, $T_3(7)=T_3(8)=8$.

Figure 5C:
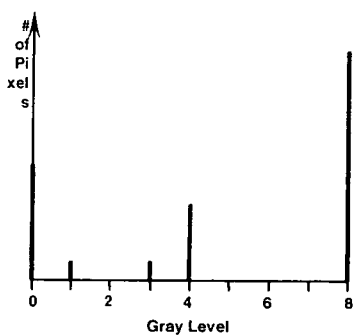
FIG. 5C is the histogram of the virtual image corresponding to FIG. 5B after a further gray-level grouping and ungrouping.

The resulting histogram is shown in FIG. 5C. The average distance between pixels on the grayscale, $D_3=1.90$, is larger than $D_5$ and $D_4$.

Step 7

To obtain the final optimally enhanced image, the optimal gray-level transformation function $T_{i_{opt}}(k)$ is retrieved from computer memory and applied to the original image.

Figure 6:
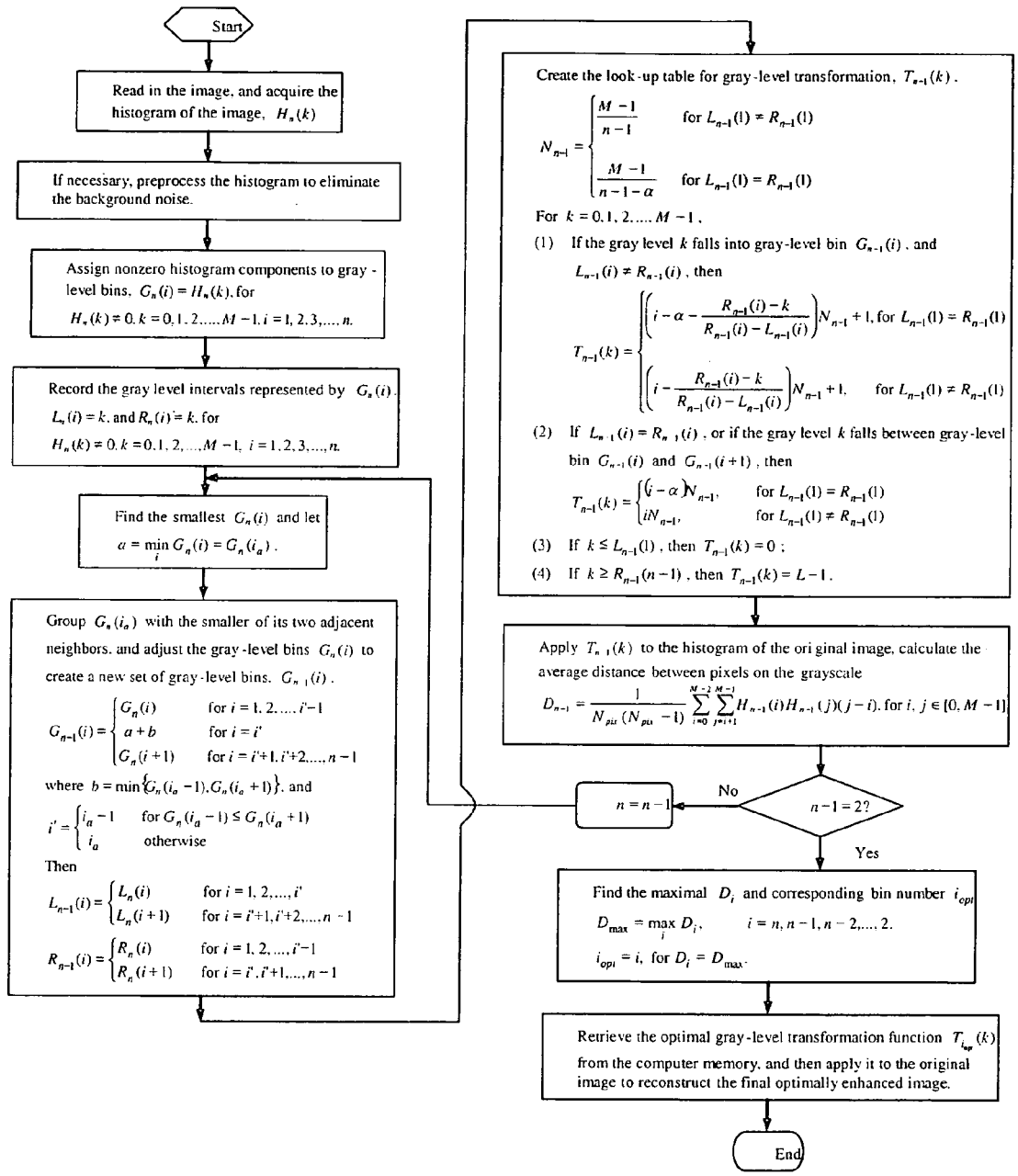
FIG. 6 is a flow chart of an optimized gray level grouping process.

FIG. 6 illustrates a flow chart of an optimized gray-level grouping algorithm.

Figure 7A:
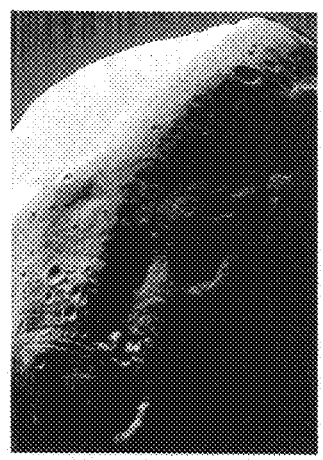
FIG. 7A the image of FIG. 1A processed by a gray-level grouping technique.
Figure 7B:
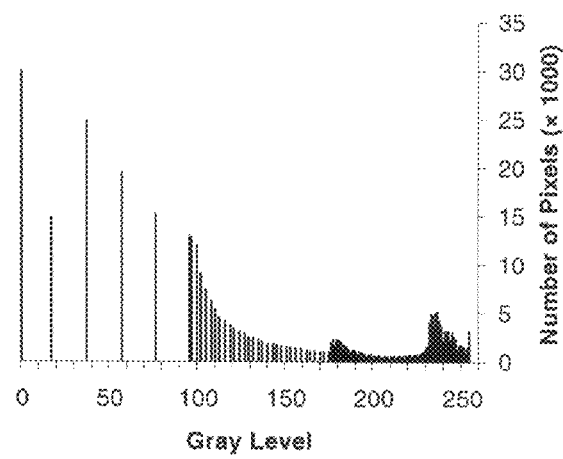
FIG. 7B. is the gray-level histogram of image components in the image of FIG. 7A.

FIGS. 7A and 7B illustrate the image resulting from applying the GLC technique to the Phobos image of FIG. 1A, and the resulting histogram, respectively. It should be pointed out that, in FIG. 7A, background noise in the upper left corner has been amplified in the basic GLG result. This effect also exists in the results of HE and histogram specification, as shown in FIGS. 2A and 3A. Potential solutions for this problem are described later herein.

Figure 8:
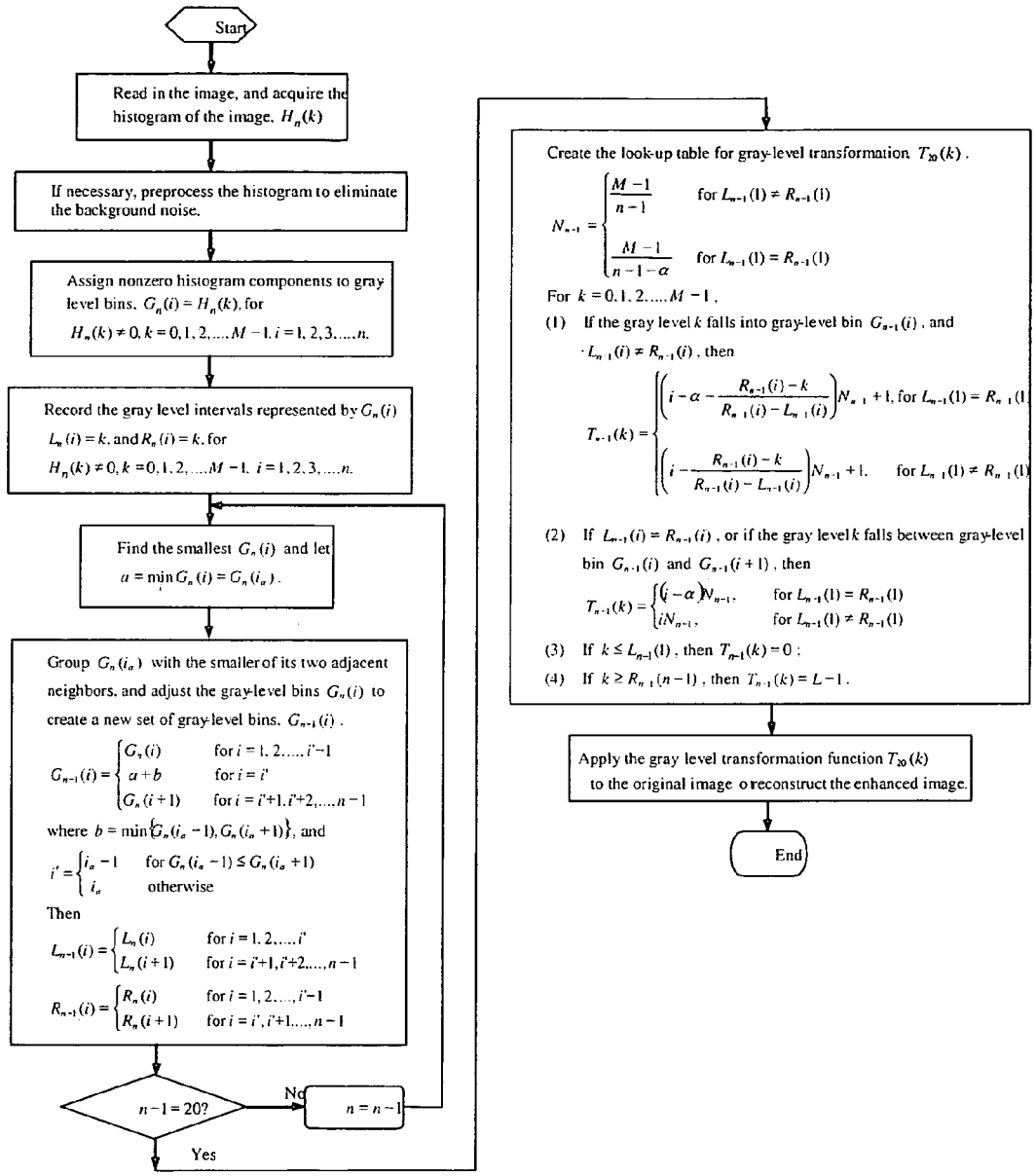
FIG. 8 is a flow chart of a fast gray-level grouping process.

It is important to note that although an approach for finding the optimal number of gray-level groups has been described herein, in many cases the quality of the resulting images is not very sensitive to the total number of gray-level bins, provided that the total number of gray-level bins is below approximately 150. This is due to the fact that the ungrouping of grouped gray levels generally results in similar spacing between high-amplitude histogram components. Therefore, in some applications a default value (e.g., 150, 100, 80, 60, 40, 20, 10, 9, 8, 7, 6, 5 4, 3 or 2) may be used for the total number of gray-level groups. However, depending on the image, the contrast enhancement resulting from a default value below approximately 150 may not be as strong as it could be with an optimal number of bins. Nonetheless, using a default value of 20 has been found to yield satisfactory results in a large number of experiments and it saves on iterations and computational expenses significantly. The feasibility of using a default (or pre-determined) number of gray-level groups of about 20 is also related to the fact that this number is comparable to the number of gray shades that the human eye can discern, which is a couple of dozen. Without constructing the transformation function and calculating the average distance between pixels on the grayscale for each set of gray-level bins, this algorithm executes much faster (more than 3 orders of magnitude faster for 8-bit images) than the optimized GLG, so it is called fast gray-level grouping (FGLG). However, in very rare cases, contrast of the GLG result of the default 20 gray level bins may be much lower than that of the optimal GLG result. FIG. 8 illustrates a flow chart for FGLG.

FIGS. 9A and 9B show the comparison of the results of treating the Phobos image of FIG. 1A by GLG with two different numbers of gray-level bins. FIG. 9A (which is the same as the image of FIG. 7A herein but is reproduced here for convenience of comparison with FIG. 9B) is the result using the optimal number of bins of 4 given by Eq. 18, and FIG. 9B is the result using the default number of bins of 20. It can be seen that there is not much difference in the two images, and both images are satisfactory.

FIG. 10A shows a low-contrast X-ray image of luggage. This image is difficult to process by conventional means because of the extensive very dark background. A special adaptation of GLC technique may be applied, in which the background is excluded when calculating the average distance between pixels on the grayscale. This technique achieves a very strong enhancement as seen in the resulting image presented in FIG. 10B The GLG results for such images are typically better than those of histogram equalization and histogram specification, and the GLG method is fully automatic.

The computational complexity of the GLG technique is basically determined by the number of comparison operations for finding the smallest gray-level groups and the to number of multiplication and/or division operations for calculating the gray level transformation functions, $T_{n-1}(k)$.

The number of comparison operations for finding the smallest gray-level group among L groups is O(L). Since the smallest gray-level group needs to be found for all possible sets of groups in the optimal GLG process, the computational complexity for finding the smallest gray-level groups is $O(L^2)$, where L is the total number of gray levels on the grayscale. For each set of gray-level groups, the number of multiplication and/or division operations for calculating the gray level transformation function is O(L). Since this also needs to be performed on all possible sets of gray-level groups in the optimal GLG process, the computational complexity for calculating gray level transformation functions in the optimal GLG process is $O(L^2)$. However, since the gray level transformation function is calculated only once in the fast GLG process, its computational complexity for multiplication operations is O(L). As comparison, the computational complexity of the HE algorithm is O(L).

In order to evaluate the competitiveness of the GLG method against existing contrast enhancement techniques, a well-known benchmark image sharpness measure, the Tenengrad criterion, may be used to compare the results of the GLG method with the various conventional methods described herein. The Tenengrad criterion is based on gradient magnitude maximization. It is considered one of the most robust and functionally accurate image quality measures. The Tenengrad value of an image/is calculated from the gradient $\nabla I(x,y)$ at each pixel (x,y), where the partial derivatives are obtained by a high-pass filter, e.g., the Sobel operator, with the convolution kernels $i_x$ and $i_y$. The gradient magnitude is given as $$S(x,y)=\sqrt{(i_x*I(x,y))^2+(i_y*I(x,y))^2}, \tag{19}$$

and the Tenengrad criterion is formulated as $$TEN = \sum_x \sum_y S(x, y)^2, \text{ for } S(x, y) > T \tag{20}$$

where T is a threshold. The image quality is usually considered higher if its Tenengrad value is larger.

The Tenengrad values (TEN) for selected images are presented in Table 1:

TABLE 1

| FIG. No. | Tenengrad value (TEN) |
| --- | --- |
| 1A | $2.9 \times 10^3$ |
| 2A | $1.6 \times 10^3$ |
| 3A | $4.4 \times 10^3$ |
| 7A | $8.5 \times 10^3$ |
| 9A | $8.5 \times 10^3$ |
| 9B | $8.1 \times 10^3$ |

It is noted that the images processed with the GLG technique (FIGS. 7A, 9A, and 9B) have significantly larger Tenengrad values, which indicates that the GLG method is superior to the conventional techniques described herein. This result agrees with the visual evaluation by the human eye. It is also worth noting that the Tenengrad criterion indicates that the optimal GLG result is slightly better than the fast GLG result, as shown by comparing FIG. 9A (optimal GLG) with FIG. 9B (fast GLG).

As previously described the average distance between pixels on the grayscale is also a suitable measure of image contrast. The values of this criterion (PixDist) for selected images is presented in Table 2.

TABLE 2

| FIG. No. | PixDist |
|---|---|
| 1A | 26.9 |
| 2A | 19.0 |
| 3A | 29.9 |
| 7A | 44.1 |
| 9A | 44.1 |
| 9B | 42.6 |

This criterion generally agrees well with the benchmark Tenengrad measure in evaluating image contrast. It also should be noted that, the PixDist results obtained from the adaptive GLG (A-GLG) technique (described hereinafter) usually do not agree with the perceived image contrasts, because the adaptive GLG process significantly changes the global histogram profile of the image, and therefore makes the comparison of the PixDist values of the global GLG and adaptive GLG results meaningless. This is one of the situations in which it may not be advantageous to use the PixDist criterion.

The gray-level grouping (GLG) technique includes an "adaptive variation." In this technique the image is first divided into an array of sub-images (usually an 8×8 array), each sub-image is treated with the GLG method, and all treated sub-images are merged together by bilinear interpolation to generate the processed whole image.

This "adaptive GLG" (A-GLG) technique is further described as follows:

Step 1

Divide the original image into an M×N array of sub-images, and process all sub-images with the GLG algorithm to obtain their optimal GLG gray-level transformation functions, i.e., $T_{i,j}(k)$, for i=1, 2, ..., M, j=1, 2, ..., N, and k=0, 1, ..., L−1. Here, L−1 represents the highest gray-level value on the grayscale.

Step 2

Create an intermediate (M+1)x (N+1) array of gray level transformation functions, $A_{i,j}(k)$, for i=1, 2, ..., M+1, j=1, 2, ..., N+1, and k=0, 1, ..., L−1, as below, i) For the four corner components, $$A_{i,1}(k)=T_{i,1}(k), A_{1,N+1}(k)=T_{1,N}(k), A_{M+1,1}(k)=T_{M,1}(k),$$
$$A_{M+1,N+1}(k)=T_{M,N}(k); \quad (21)$$

ii) For the boundary components, $$A_{i,j}(k) = \begin{cases} T_{i,j}(k) & \text{for } T_{i,j-1}(k) = L-1 \\ T_{i,j-1}(k) & \text{for } T_{i,j}(k) = L-1 \\ (T_{i,j-1}(k) + T_{i,j}(k))/2 & \text{otherwise} \end{cases} \quad (22)$$

for i=1, M+1, j=2, 3, ..., N, and k=0, 1, ..., L−1; and $$A_{i,j}(k) = \begin{cases} T_{i,j}(k) & \text{for } T_{i-1,j}(k) = L-1 \\ T_{i-1,j}(k) & \text{for } T_{i,j}(k) = L-1 \\ (T_{i-1,j}(k) + T_{i,j}(k))/2 & \text{otherwise} \end{cases} \quad (23)$$

for i=2, 3, ..., M, j=1, N+1, and k=0, 1, ..., L−1.

iii) For the interior components, $$A_{i,j}(k) = \frac{1}{p}\sum_{m,n} T_{m,n}(k) \text{ for } T_{m,n}(k) \ne L-1 \quad (24)$$

where m=i−1, i; n=j−1, j; and p=4, 3, 2, or 1, which equals to the number of operands in the numerator. The above equation applies to i=2, 3, ..., M, j=2, 3, ..., N, and k=0, 1, ..., L−1.

This step is an averaging process to balance the contrast of adjacent sub-images in the final output image. If gray level k in the original image is mapped to gray level L−1 by $T_{i,j}(k)$, it is considered as background and therefore excluded from the averaging process.

Step 3

Perform bilinear interpolation to reconstruct the final output image. For each original sub-image $I_{i,j}(x, y)$, function $k=I_{i,j}(x, y)$ returns the gray-level value k of the pixel at sub-image coordinate, (x, y), for x=1, 2, ..., $h_{i,j}$, y=1, 2, ..., $w_{i,j}$, where $h_{i,j}$ and $w_{i,j}$ are the height and width of the corresponding sub-image, respectively. The bilinearly-interpolated output sub-image, $O_{i,j}(x, y)$, is given by the following expression, $$O_{i,j}(x, y) = \frac{1}{(h_{i,j}+1)(w_{i,j}+1)} \times \begin{bmatrix} (h_{i,j}+1-x)[(w_{i,j}+1-y)A_{i,j}(k) + yA_{i,j+1}(k)] + \\ x[(w_{i,j}+1-y)A_{i+1,j}(k) + yA_{i+1,j+1}(k)] \end{bmatrix} \quad (25)$$

for x=1, 2, ..., $h_{i,j}$, y=1, 2, ..., $w_{i,j}$, and $k=I_{i,j}(x, y)$.

The final processed whole image is obtained by stitching the array of output sub-images together.

FIG. 11A shows the A-GLG result of the Phobos image with comparison to the global GLG result (FIG. 11B, which is the same as FIGS. 7A and 9A and reproduced here for convenience of comparison with FIG. 11A). It can be seen that the A-GLG results are somewhat better than the global GLG results.

FIG. 12A shows the A-GLG result of the X-ray image of luggage with comparison to global GLG result (FIG. 12B, which is the same as FIG. 10B and reproduced here for convenience of comparison with FIG. 12A). In the A-GLC image, the razor in the bag is brighter and clearer and some objects that are invisible become readily apparent (e.g., the tip of the strap to the right of the luggage, as shown by the white oval in the image).

Gray-level grouping (GLG) is a generalized and powerful technique, which can be conveniently applied to a broad variety of low-contrast images and generate satisfactory results. The GLG technique may be conducted with full automation at fast speeds and outperforms conventional contrast enhancement techniques. The benchmark image quality measure, Tenengrad criterion, indicates that the GLG results are superior to conventional techniques described herein. The optimized GLG algorithm generally is able to process an image within a few seconds on a personal computer (PC), and the fast GLG algorithm (FGLG) can generally process an image on the time scale of millisecond on a PC. The basic GLG method also provides a platform for various extensions of this technique, such as selective gray-level grouping (SGLG), (S)GLG with preprocessing steps for eliminating image background noises, and (S)GLG on color images, as described hereinafter.

Figure 13A:
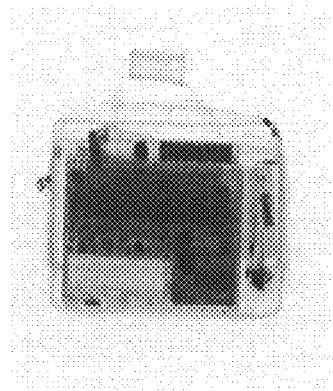
FIG. 13A is an x-ray image of a piece of baggage.
Figure 13B:
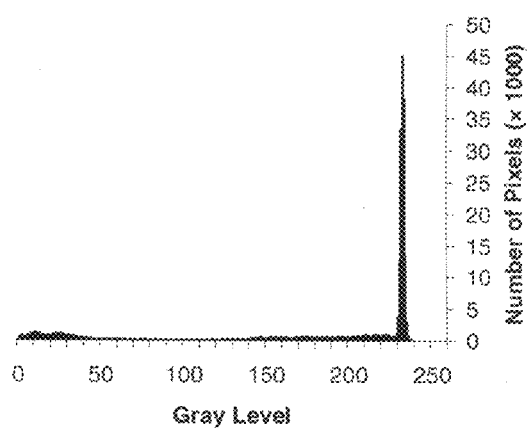
FIG. 13B is the gray-level histogram of image components in the image of FIG. 13A.
Figure 14A:
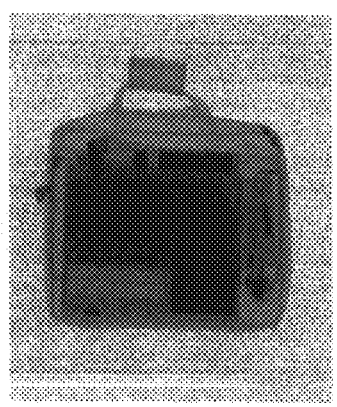
FIG. 14A is a modification of the image of FIG. 13A produced by histogram equalization (HE)
Figure 14B:
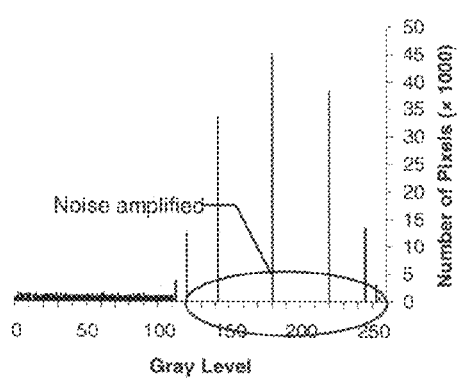
FIG. 14B is the gray-level histogram of image components in the image of FIG. 14A.

In some applications further improvement in image quality may be desired. For example, some low-contrast images have noisy backgrounds representing a fairly large percentage of the image area. The high amplitudes of the histogram components corresponding to the noisy image background often prevent the use of conventional histogram equalization techniques and even a basic GLG technique, because these techniques would significantly amplify the background noise, rather than enhance the image foreground. For example, FIG. 13A shows an original low-contrast X-ray image of baggage, and FIG. 13B its histogram. FIG. 14A is the result of its histogram equalization, and FIG. 14B the resulting histogram. Due to the high amplitude of the histogram components corresponding to the noisy background in the original image, the background noise in the output image has been significantly amplified. Since the background histogram components are spread out on the grayscale, the space for other histogram components has been compressed, and as a result, the contrast of the contents in the baggage is decreased instead of increased. FIG. 15A shows the result of applying the fast GLG method to the X-ray baggage image, and FIG. 15B the resulting histogram. This result is obviously better than the result of histogram equalization because it has less background noise and results in a contrast increase for the contents of the baggage. However, also due to the large amplitudes of the histogram components corresponding to the noisy background, the background noise has been significantly amplified compared to the original, and the resulting image is not entirely satisfactory.

Some applications require enhancing part of an image which corresponds to a certain segment of the image histogram, or enhancing different parts of the histogram to different extents. For example, FIG. 16A shows an original low-contrast scanning electron microscopy (SEM) image of tungsten filaments, and FIG. 16B its histogram. The filament in the center of the image and its support are quite clear and easy to study. There is another filament structure on the right side of the image, but it is much darker and its size and other features are not as easily discernable. Now the application requires enhancing the dark filament structure on the right side. FIG. 17A shows the result of performing histogram equalization on the original image, and FIG. 17B the resulting histogram. It can be seen that, after treatment, the brightness of the dark filament structure on the right side of the image is increased only a little; however, its fine details are lost in the treatment. For this image, the histogram component corresponding to the background (the largest peak on the histogram) lies in the middle of the histogram profile corresponding to the dark filament structure at the lower end of the original image histogram. The HE process divided this lower-end histogram profile into two parts, and separated them apart as shown in FIG. 17B. This explains why the brightness of some regions of the right filament structure is increased a little. However, some of its fine details are lost due to the compression of the histogram segments corresponding to the dark filament structure. In this case, the result of applying the basic GLG algorithm is not much better than that of HE, as shown in FIG. 18A and the corresponding histogram in FIG. 18B.

FIG. 19A shows the result of using histogram statistics for contrast enhancement, and FIG. 19B the resulting histogram. This is a local enhancement method, and its transformation function is as follows, $$g(x, y) = \begin{cases} 4.0 f(x, y) & \text{if } m_{S_{xy}} \leq M_G \text{ and} \\ & 0.02 D_G \leq \sigma_{S_{xy}} \leq 0.4 D_G \\ f(x, y) & \text{otherwise} \end{cases} \quad (26)$$

where f(x, y) represents the value of the image pixel at any image coordinates (x, y), and g(x, y) represents the corresponding enhanced pixel at these coordinates; $M_G$ is the global mean of the input image; and $D_G$ is its global standard deviation; $S_{xy}$ is a 3×3 sub-image centered at coordinates (x, y); $m_{S_{xy}}$ is the local mean in $S_{xy}$, and $\sigma_{S_{xy}}$ is the local standard deviation in $S_{xy}$. It can be noted that, although this result is much better than the histogram equalization result, some fine details of the rear structure are also lost, with the appearance of some small bright dots in the shadow area where the coil meets the support stem, and false edges and regions around some of the borders between the filament and the background. The artifacts created by this enhancement technique are undesirable in most applications. It also should be pointed out that this statistical enhancement method is neither general nor automatic; the transformation function in Eq. 26 must be specified by the user, and its multiple parameters generally need to be determined by the user through a trial-and-error process.

In view of these just-described limitations, it is sometimes desirable to extend the capabilities of the basic GLG technique so that it can more satisfactorily enhance a wider range of low-contrast images including images with noisy backgrounds, and be able to enhance a part of an image corresponding to a certain segment of the image histogram per application requirements. One technique for doing this is "selective gray-level grouping" (SGLG). Also two preprocessing methods may be used which may substantially eliminate background noise in noisy low-contrast images so that such images may be properly enhanced by the (S)GLG technique, as well as local approaches of SGLG—such as adaptive SGLG (A-SGLG) and contrast-limited adaptive SGLG (CLA-SGLG). Embodiments of these techniques are described hereinbelow.

As seen in FIGS. 15A and 15B, the basic GLG algorithm amplified the background noise because the original image has a noisy background representing a fairly large percentage of the image area. This effect may be overcome by extending the basic GLG to "selective" gray-level grouping (SGLG). In the basic GLG processing, since all histogram components are treated equally, if the histogram amplitudes of the noisy background components are high, the noise is amplified in the resulting image.

Images like the one shown in FIG. 13A have high-amplitude histogram components corresponding to a noisy background. The contrast of such images needs to be enhanced without amplifying the background noise. Therefore, the histogram should be cut in two or more segments, and each segment treated differently. It is noted that for this kind of images, the histogram components with the highest amplitudes are those of the noisy background. Since their amplitudes are much larger than the rest of the histogram components, the background and its noise can be considered as separate from the rest of the histogram (although some useful data might be lost in this treatment), and should be treated as one gray-level bin, which will result in the background noise being suppressed instead of amplified. The rest of the histogram should preferably be divided into an optimal number of groups for GLG treatment as previously described herein. It is possible to automatically find the approximate left and right bottom points of the background on a histogram, given that the noisy background components are much higher than the rest of the histogram, and use these points as breakpoints to cut the histogram. Therefore, the parameters for this scheme can be automatically selected.

The basic algorithm of Selective Gray-Level Grouping technique is as follows:

Step 1

When necessary (as described below), break the grayscale into two or more segments, and specify the new gray-level value(s) at the division point(s). The new gray-level values can be determined according to the desired application. Typical circumstances to break the grayscale are:

a. Conditions like in FIG. 13B, the histogram components corresponding to the background can be easily separated from the histogram components corresponding to the foreground, and the background is noisy.
   b. Conditions like FIG. 16B, the histogram components of the image are concentrated in two or more locations on the grayscale, i.e., the histogram is bi-modal or multi-modal. The application purpose requires enhancing the part of the image corresponding to the histogram components concentrated in one location on the grayscale.

Step 2

For each grayscale segment, perform the basic GLG as previously described herein.

When using SGLG to treat the X-ray image in FIG. 13A, the grayscale is broken into two segments. The breakpoint is at the boundary between the histogram components corresponding to the background and the rest of the image, which is the minimum point between the background peak and the rest of histogram components, and is gray level 227 in this case. Since the objective is to suppress the background noise and achieve optimum enhancement for the baggage in the image, a single bin is assigned to all gray levels above gray level 227, and the new value assigned to all gray levels in this bin is 255. The optimal group number for the grayscale segment containing the rest of the histogram can be found by using the procedure described herein, and this grayscale segment is mapped to a new gray level interval [0, 254]. FIG. 20A shows the result of this SGLG treatment, and FIG. 20B the resulting histogram. Not only has the contrast of the contents in the baggage been significantly enhanced, but the background noise has also been essentially eliminated. The Tenengrad values (TEN) of selected images are depicted in Table 3.

TABLE 3

| FIG. No. | Tenengrad value (TEN) |
|---|---|
| 13A | $3.3 \times 10^3$ |
| 14A | $2.6 \times 10^4$ |
| 15A | $4.6 \times 10^3$ |
| 20A | $3.5 \times 10^3$ |

The HE (FIG. 14A) and basic GLG (FIG. 15A) results have higher Tenengrad values than the SGLG result FIG. 20A because of their significantly amplified background noise, but their visual image quality appears to be inferior.

The values of one image contrast criterion described previously herein, that is, the average pixel distance on the grayscale (PixDist), are also calculated for the selected images, and the results are depicted in Table 4.

TABLE 4

| FIG. No. | PixDist |
|---|---|
| 13A | 37.3 |
| 14A | 42.1 |
| 15A | 40.9 |
| 20A | 40.5 |

This criterion generally agrees well with the benchmark Tenengrad measure in evaluating image contrast.

As previously discussed herein, the quality of the resulting images is often not very sensitive to the total number of gray-level bins. FIGS. 21A and 21B show the results of treating the X-ray image by SGLG with the optimal number of gray-level bins (FIG. 21A) and the fast SGLG with the default number, 20 (FIG. 21B). FIG. 21A is obtained by using the optimal number of 149 given by Eq. 18 herein. It can be seen that, although the optimal result reveals slightly more fine details in the contents of the baggage, there is not much difference in the two images, which are both satisfactory. The Tenengrad values and the pixel spacing distances for FIGS. 21A and 21B are presented in Table 5. The Tenengrad criterion indicates that the optimal SGLG result is better than the fast SGLG result.

TABLE 5

| FIG. No. | Tenengrad value (TEN) | PixDist |
|---|---|---|
| 21A | $3.5 \times 10^3$ | 40.5 |
| 21B | $3.0 \times 10^3$ | 40.0 |

A second example where a SGLG operation may be beneficial is the image depicted in FIG. 16A. It is found that the histogram components of this image are concentrated in two locations on the grayscale—the low end and the high end. Therefore, the histogram may be divided into two segments, with a breakpoint at gray level 50, which corresponds to the minimal histogram component between the two histogram profiles. Since the objective is to enhance the dark rear structure in the image, the left grayscale segment containing the histogram components corresponding to the rear structure is mapped to a wider new gray level interval [0, 170], and the right segment mapped to a narrower new gray level interval [171, 255]. These values for gray level intervals should be specified by the user according to the application requirements. The optimal number of gray-level bins in each segment can be found by using the procedure described herein. FIG. 22A shows the SGLG result of the filament SEM image, and FIG. 22B the resulting histogram. It is obvious that this result is better than the HE result in FIG. 17A and the basic GLG result in FIG. 18A—not only has the brightness of the rear structure been significantly increased, but its fine details have also been revealed. This can be verified by noting that the histogram components corresponding to the dark filament structure have been properly spread out over the grayscale. This result is also better than the local statistical enhancement result in FIG. 19A, because in addition to fine details of the rear structure being revealed, there are no undesirable artifacts. Furthermore, the SGLG result is achieved quasi-automatically—the only intervention needed from the user is to specify the grayscale breakpoint and its new location on the grayscale. The Tenengrad value of the SGLG result is $1.2 \times 10^3$, which is lower than those of HE ($14 \times 10^3$), basic GLG ($1.6 \times 10^3$) and the statistical enhancement ($1.5 \times 10^3$) because the contrast of the large-area front filament structure is compressed in the SGLG result, in order to make space on the grayscale for the dark rear structure. In this application-specific processing, it does not make much sense to use a global quality measure.

Figure 23A:
FIG. 23A depicts a noisy low-contrast thermal image.
Figure 23B:
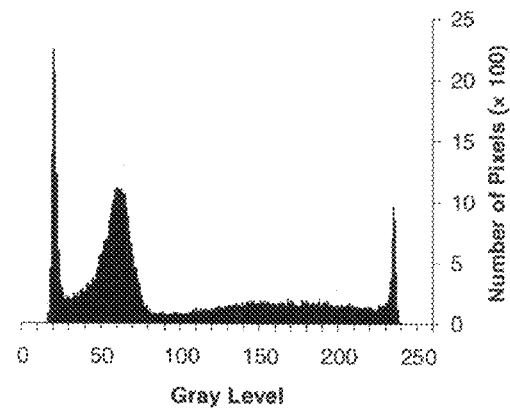
FIG. 23B is the gray-level histogram of image components in the image of FIG. 23A.
Figure 24A:
FIG. 24A is an enhancement of the image of FIG. 23A produced by a basic gray-level grouping (GLG) process.
Figure 24B:
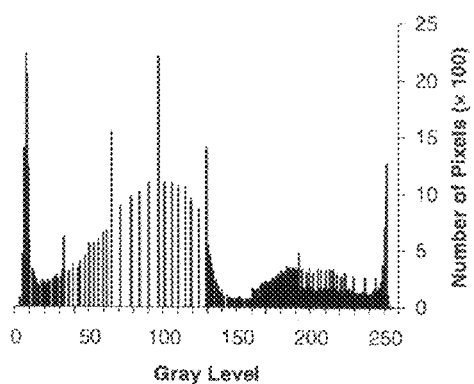
FIG. 24B is the gray-level histogram of image components in the image of FIG. 24A.

Low-contrast images with noisy backgrounds like the one in FIG. 13A may be conveniently enhanced by SGLG with background noise elimination. Since the histogram components corresponding to the noisy background are located either at the high end of the grayscale or at the low end and their amplitudes are much higher than those of the rest of the image histogram, the background components can be easily separated and SGLG can be conveniently applied to such images. However, for some other low-contrast images with very noisy backgrounds like the thermal image shown in FIG. 23A, the amplitudes of the background histogram components are not much higher than those of the rest of the histogram, and they are located neither at the high end of the grayscale nor at the low end, as shown in FIG. 23B. It is difficult to separate the background components from the rest of the histogram. That is, not only may the basic gray-level grouping (GLG) method not generate satisfactory contrast-enhancement results if applied directly (as evidenced by the resulting image in FIG. 24A, and the corresponding histogram in FIG. 24B, with the histogram of the background in the resulting image shown in FIG. 24D), it is also difficult to apply selective gray-level grouping (SGLG) method to these images. Since the histogram components corresponding to the noisy background overlap with those of the foreground, it may be difficult to find the proper breakpoints accurately to separate the noisy background and the useful foreground effectively. Consequently, it is helpful to preprocess such images to reduce or remove the background noise before the GLG technique is applied. Two methods have been developed to basically eliminate background noise from such images.

Background Subtraction Method

Figure 24C:
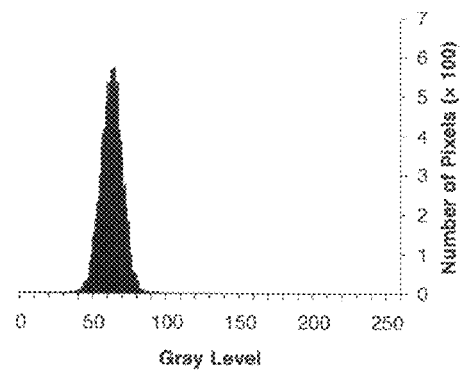
FIG. 24C is the histogram of a sample patch of the noisy background of the image of FIG. 23A.
Figure 24D:
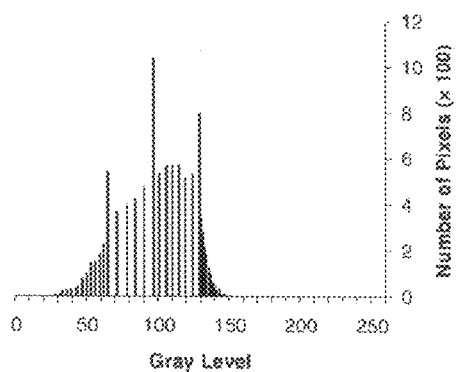
FIG. 24D is histogram of the same sample patch depicted in FIG. 24C, taken from FIG. 24A (after the image of FIG. 23A was processed by basic GLG)
Figure 24E:
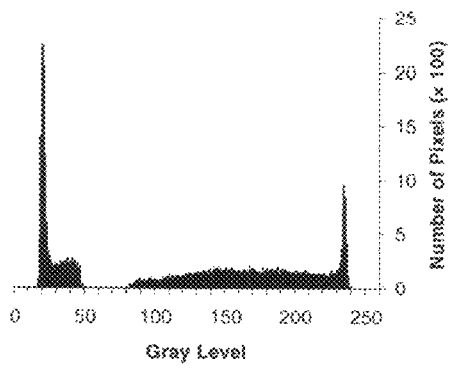
FIG. 24E is the gray-level histogram of image components resulting from rescaling the noisy background histogram of FIG. 24C and subtracting that from the histogram of the original image (FIG. 23A)

In the first approach to eliminate background noise from images, a sample patch of the noisy background of the image is cut and its histogram, $H_B(k)$, is obtained, as shown in FIG. 24C. This noisy background histogram is then rescaled and subtracted from the histogram of the original image as described by the following equation, $$H(k) = \begin{cases} 0, & \text{if } H_I(k) - \frac{N_I}{N_B}\beta \cdot H_B(k) < 0 \\ H_I(k) - \frac{N_I}{N_B}\beta \cdot H_B(k), & \text{otherwise} \end{cases} \quad (27)$$

for k=0, 1, ..., M−1.

where $H_I(k)$ is the histogram of the original image, $N_I$ is the number of pixels in the original image, $N_B$ is the number of pixels in the sample patch of the noisy background, and β is a coefficient which properly adjusts the amplitude of $H_b(k)$ and assumes a value of 0.9 in our experiments. The resulting modified histogram, $H(k)$, is shown in FIG. 24E, which illustrates that not only the histogram components corresponding to the noisy background have been eliminated, but also some foreground histogram components once overlapped with the background have been restored. FIG. 24C shows that the noisy background histogram spans over a gray-level interval [36, 95], but the corresponding empty grayscale segment in FIG. 24E with background histogram removed spans over a narrower gray-level interval [50, 80].

Figure 25A:
FIG. 25A is the an enhancement of the image of FIG. 23A resulting from a combination of GLG with background subtraction processing.
Figure 25B:
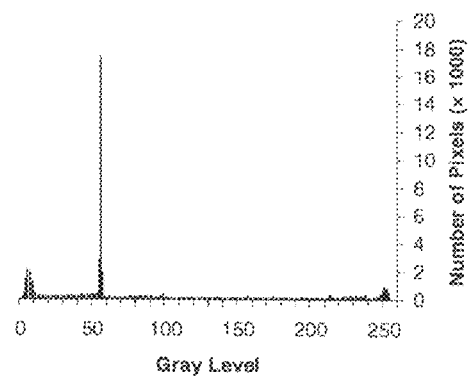
FIG. 25B is the histogram resulting from applying a basic GLG method to the histogram of FIG. 24E.
Figure 25C:
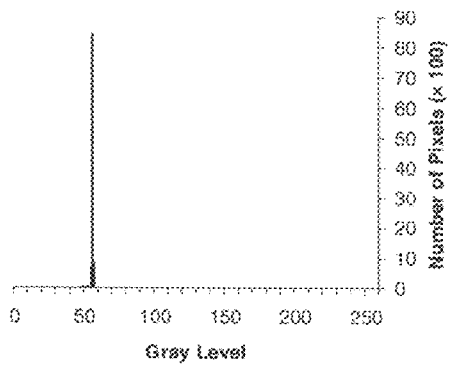
FIG. 25C is the background histogram of the basic GLG result (FIGS. 25A/25B) after background subtraction.
Figure 26:
FIG. 26 is the image resulting from filtering the image of FIG. 25A with a 3×3 median filter mask.

The regular basic GLG algorithm may now be directly applied to the preprocessed histogram, $H(k)$. The resulting image is shown in FIG. 25A, and its corresponding histogram in FIG. 25B. The histogram of the background in the resulting image shown in FIG. 25C indicates that the background noise has been substantially removed. It can be noted that the resulting image is quite satisfactory. This result can be further post-processed with a 3×3 median filter mask to reduce the noise in the foreground, as shown in FIG. 26. The application purpose for enhancing the contrast of this thermal face image is to improve the features of the face, so that edge detection algorithms and segmentation algorithms, etc., can be applied to the resulting image for applications such as face recognition, registration and fusion with visual images, and so on. FIG. 26 is a good candidate for these applications.

It is also worth noting that this noise-removal technique of background histogram subtraction is not restricted to the GLG method; it may also be used to preprocess images before other contrast enhancement techniques such as histogram equalization are applied.

Statistical Averaging

The second approach to eliminate background noise from images is a statistical averaging method, where a sample patch of the noisy image background is also needed and its histogram obtained. One procedure for removing background noise is as follows:

1) The background noise is analyzed and its statistical parameters are obtained. In the image of FIG. 26, the background noise is Gaussian, with a mean of 63, and a variance of 6.3×10⁻⁴. Even if the background noise is not Gaussian, it may still be treated as Gaussian in this de-noising process by selecting the mean to be the central gray level of the noise profile. In the present treatment, the width of the discrete background noise profile is considered as 6.56 based on a number of experiments, where σ is the standard deviation of the Gaussian distribution. Based on this assumption, the standard deviation and variance of the background noise may then be derived from the noise data.

2) A noiseless background image is generated by creating an artificial image of the same size as the original image and with all pixels having one gray-level value—the Gaussian mean of the background noise.

3) The artificial image is then corrupted by an artificial noise of the same statistical characteristics as the real background noise.

4) This artificial noisy background image is combined with the original image in the following manner:

a. If the gray-level value of a pixel in the original image is within the range of the noisy background on the background histogram, its value is added to that of the corresponding pixel in the artificial image. In a preferred embodiment, the boundaries of the noisy background are determined by the following equations, $$n_l = m - \frac{\gamma}{2}(B_r - B_l) \quad (28)$$

$$n_r = m + \frac{\gamma}{2}(B_r - B_l) \quad (29)$$

where $n_l$ and $n_r$ are considered the left and right boundaries of the background noise respectively, $B_l$ and $B_r$ are the gray-level values of the leftmost and rightmost non-zero histogram components of the background noise profile respectively, m is the mean of Gaussian noise, and γ is a coefficient used to avoid removing too much foreground information in the de-noising process and assumes a value of 0.8 in a preferred embodiment. Based on Eq. 28 and Eq. 29, the range of the noisy background [$n_l$, $n_r$] of the histogram shown in FIG. 24C is the gray-level interval [39, 87].

b. If the gray-level value of a pixel in the original image falls out of the range [$n_l$, $n_r$], it is considered a foreground pixel and just doubles its value, so the foreground information of the original image can be preserved.

5) Go back to Step 2, and repeat the process on the resulting image by generating a new artificial noisy background image and combining it with the resulting image from the previous step. This procedure is repeated for a statistically large number of times, $N_S$, and the final combined image is divided by $N_S+1$ to generate the de-noised image as shown in FIG. 27A.

It is worth noting that, even if the background noise in the original image is not Gaussian, an artificial Gaussian noise still may be used in generating the artificial noisy background image in the above procedure, as long as it spans over the same range as the real noise in the original image, since the real noise will still be averaged out after the above process. The range of the background noise in the original image may be easily obtained from the background histogram. Although the preceding explanation of the statistical averaging process uses the statistical mean of the background noise, it should be noted that alternatively the statistical median of the background noise may be used. The term "statistical central tendency" is used herein to refer to a statistic that is selected from the group consisting of (1) the statistical mean and (2) the statistical median.

Figure 27A:
FIG. 27A is the result of de-noising background noise from the image of FIG. 25A using a statistical averaging method.
Figure 27B:
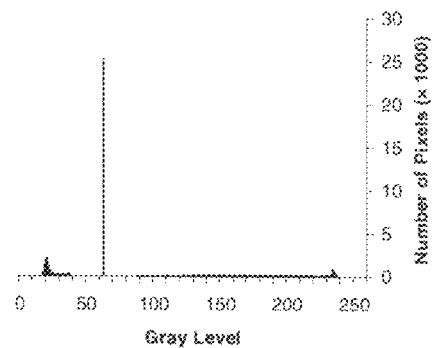
FIG. 27B is the gray-level histogram of image components in the image of FIG. 27A.
Figure 28A:
FIG. 28A the an enhancement resulting from processing the image of FIG. 27A with a modified version of the basic gray-level grouping process (mGLG)
Figure 28B:
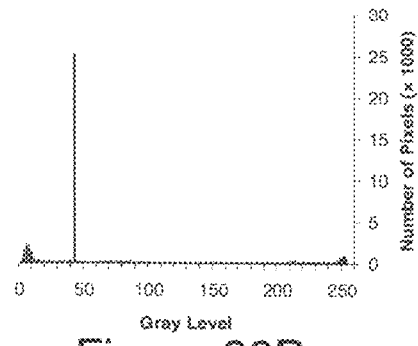
FIG. 28B is the gray-level histogram of image components resulting from applying the mGLG process to the histogram of FIG. 27B.
Figure 28C:
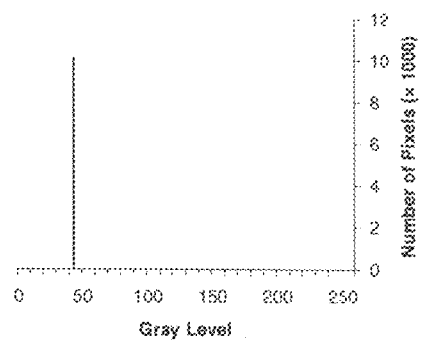
FIG. 28C is the background gray-level histogram of image components resulting from applying the mGLG process to the histogram of FIG. 27B.

FIG. 27A shows that the background noise of the preprocessed image has been essentially eliminated by statistical averaging, and the resulting histogram is shown in FIG. 27B. The de-noised image may then be fully automatically processed by a modified version of the basic gray-level grouping algorithm (mGLG). In this mGLG treatment, the highest histogram component is found and considered the de-noised background, and it is deleted from the histogram profile. All other histogram components are then treated with the regular GLG method to generate the contrast-enhanced image as shown in FIG. 28A, which is also quite satisfactory and even a little better than the result of the first approach. The histogram of the resulting image is shown in FIG. 28B, and its background histogram in FIG. 28C. The de-noising effect of the statistical averaging approach is often stronger than that of background subtraction, because the background histogram of the background subtraction result still has a profile and contains a number of components, while that of the statistical averaging result contains only single large spike, which indicates that background noise has been completely eliminated.

Figure 29A:
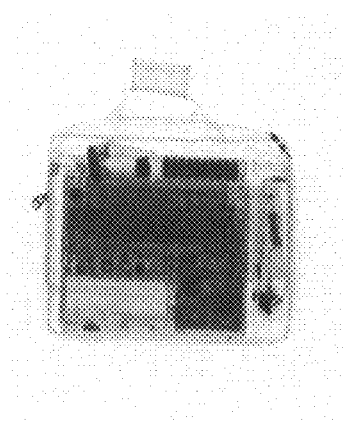
FIG. 29A is the same as FIG. 13A, reproduced in proximity to FIGS. 29B-D for ease of comparison.
Figure 29B:
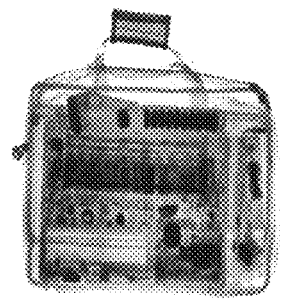
FIG. 29B is an enhancement of the image of FIG. 29A produced by an adaptive gray-level grouping (A-GLG) process.
Figure 29C:
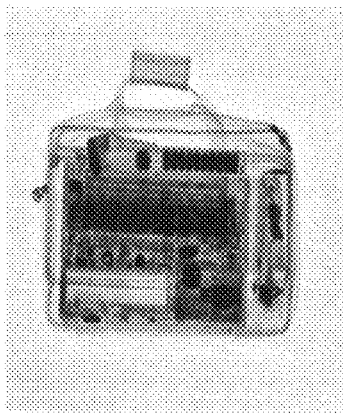
FIG. 29C is a modification of the image of FIG. 29A produced by contrast-limited adaptive histogram equalization (CLAHE)
Figure 29D:
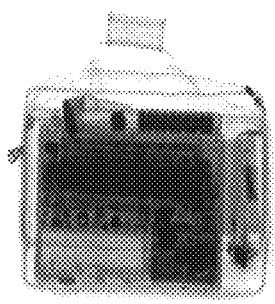
FIG. 29D is an enhancement of the image of FIG. 29A resulting from a global selective gray-level grouping (SGLG) process.

Similar to adaptive gray-level grouping (A-GLG) and contrast-limited gray-level grouping (CLA-GLG) discussed hereinbefore, selective gray-level grouping (SGLG) also has adaptive counterparts—A-SGLG, or CLA-SGLG. FIG. 29A repeats the image of FIG. 13A for ease of comparison. FIG. 29B displays the A-SGLG result of the X-ray baggage image in comparison to the contrast-limited adaptive histogram equalization (CLAHE) (FIG. 29C) result and the global SGLG result (FIG. 29D). It can be seen that the A-SGLG results (FIG. 29B) are obviously better than CLAHE (FIG. 29C) and global SGLG results (FIG. 29D). In the A-SGLG result, not only more details in the contents of the baggage have been revealed, but also the handle and edges of the baggage look more distinct. The Tenengrad values of the images also confirm the superiority of the A-SGLG result (FIG. 29B), as illustrated by Table 6.

TABLE 6

| FIG. No. | Tenengrad value (TEN) |
|---|---|
| 29A | $3.3 \times 10^3$ |
| 29B | $8.8 \times 10^3$ |
| 29C | $5.7 \times 10^3$ |
| 29D | $3.5 \times 10^3$ |

Figure 30A:
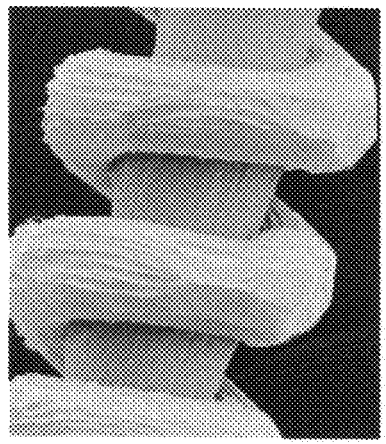
FIG. 30A is the same as FIG. 16A, reproduced in proximity to FIGS. 30B-D for ease of comparison.
Figure 30B:
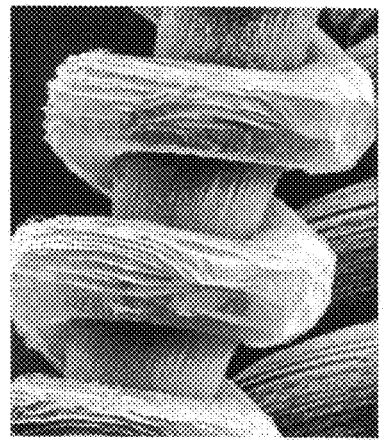
FIG. 30B is an enhancement of the image of FIG. 30A produced by an adaptive gray-level grouping (A-GLG) process.
Figure 30C:
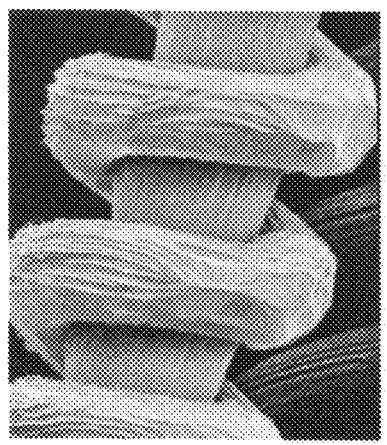
FIG. 30C is a modification of the image of FIG. 30A produced by contrast-limited adaptive histogram equalization (CLAHE)
Figure 30D:
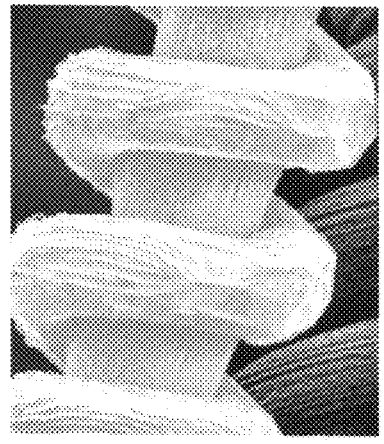
FIG. 30D is an enhancement of the image of FIG. 30A produced by a contrast-limited adaptive SGLG (CLA-SGLG) process.

FIG. 30A repeats the image of FIG. 16A for ease of comparison with enhanced images. FIG. 30B shows the A-SGLG result of the SEM image with comparison to the CLAHE result in FIG. 30C. It can be seen that the A-SGLG result is better. In A-SGLG, when SGLG is performed on each sub-image, the histogram of the resulting sub-image spans over the entire grayscale to achieve maximal enhancement. However, if the application requires preserving the relative brightness of a certain part of the image with respect to the rest of the image, then the contrast-limited A-SGLG (CLA-SGLG) may preferably be applied. In CLA-SGLG, the input image is first divided into an array of sub-images, and then each sub-image is treated with SGLG, but the histogram of the resulting sub-image spans over only certain gray-level intervals specified by the user. After all sub-images are treated, they are merged into the resulting whole image using bilinear interpolation. FIG. 30D shows the CLA-SGLG result of the SEM image, in which the relative brightness of the front structure with respect to the rear structure has been preserved, at the expense of the contrast enhancement of the rear structure which is not as strong as in the A-SGLG result. In this treatment, the breakpoint was set at gray level 35, all gray levels below 35 in the original sub-images are mapped into the gray-level interval [0, 145], and all gray levels above 35 in the original sub-images are mapped into the gray-level interval [146, 255] in the resulting sub-images. These values are specified by the user according to specific application requirements.

Gray-level grouping techniques may be used to enhance low-contrast color images using either the hue-saturation-intensity (HSI) or the red-green-blue (RGB) color models. The R, G, and B channels of an RGB color model are each an example of a color spectral constituent. When using the HSI color model, the color image is first decomposed into hue, saturation and intensity constituents, then the GLG method is applied to the intensity constituent, without altering the hue and saturation constituents. After that, the processed intensity constituent is combined with the hue and saturation constituents to compose the output color image. When using the RGB color model, the GLG method is first applied to the red, green and blue constituents respectively. The maximal total distances between image components (e.g., pixels) on grayscale of the three channels are compared to determine which color constituent is most enhanced. The transformation function for the constituent with the highest enhancement is then used to treat all color constituents, and combine the treated constituents to compose the output color image.

FIGS. 31-33 (each A-D) illustrate low-contrast color images and the results of treating them by conventional tonal correction techniques and by GLG. FIG. 31A is a flat color image, FIG. 32A is a light (high key) color image, and FIG. 33A is a dark (low key) color image. In conventional tonal correction techniques, different power-law transformation functions are required for these different classes of images. FIG. 31B shows the result of treating the flat image in FIG. 31A with an "S-shape" gray-level transformation function applied to the RGB channels respectively. This function is formulated in Eq. 30 and depicted in FIG. 34A.

$$T(k) = \begin{cases} 127.5 \times \left(\frac{k}{127.5}\right)^3 & \text{for } k = 0, 1, 2, \ldots, 127 \\ 127.5 + 127.5 \times \left[1 - \left(\frac{255-k}{127.5}\right)^3\right] & \text{for } k = 128, 129, \ldots, 255 \end{cases} \quad (30)$$

Figure 32A:
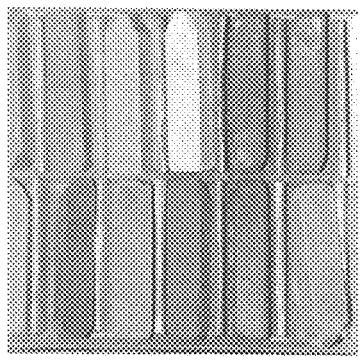
FIG. 32A is a high-key color image.
Figure 32B:
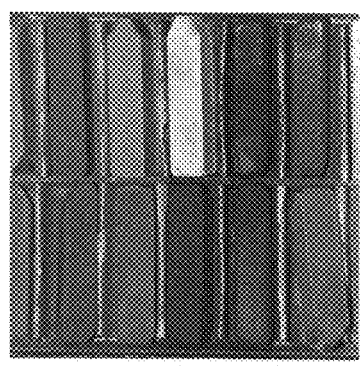
FIG. 32B is modification of the image of FIG. 32A using tonal correction.
Figure 34A:
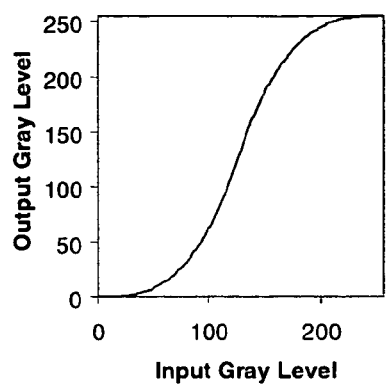
FIG. 34A is the tonal correction function used in Eq. 30.
Figure 34B:
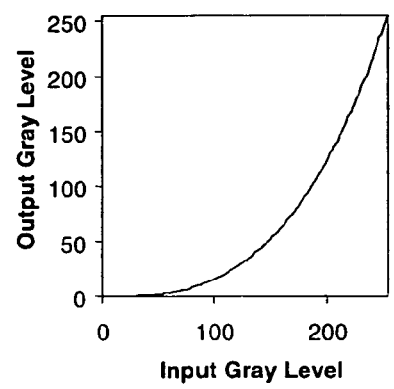
FIG. 34B is the tonal correction function used in Eq. 31.

FIG. 32B shows the result of processing the light image in FIG. 32A with a power-law function which is formulated in Eq. 31 and depicted in FIG. 34B.

$$T(k) = 255 \times \left(\frac{k}{255}\right)^3 \text{ for } k = 0, 1, 2, \ldots, 255 \quad (31)$$

Figure 33A:
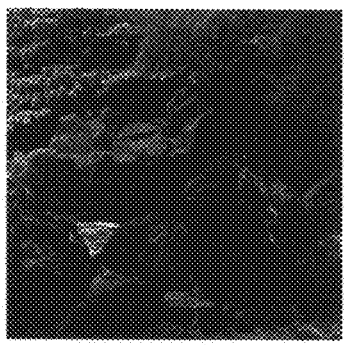
FIG. 33A is a low-key color image.
Figure 33B:
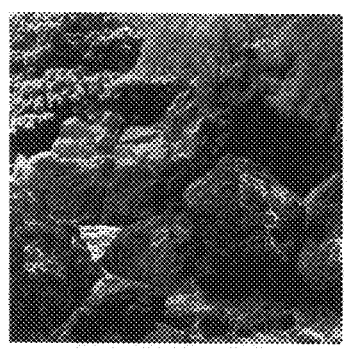
FIG. 33B is modification of the image of FIG. 33A using tonal correction.
Figure 34C:
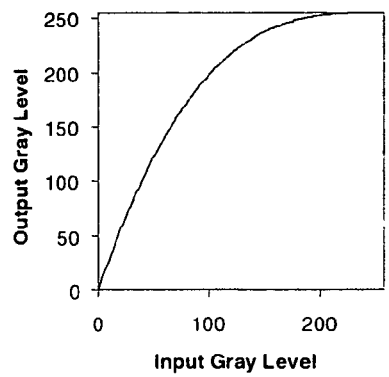
FIG. 34C is the tonal correction function used in Eq. 32.

FIG. 33B shows the result of processing the dark image in FIG. 33A with a gray-level transformation function which is formulated in Eq. 32 and depicted in FIG. 34C.

$$T(k) = 255 \times \left[1 - \left(\frac{255-k}{255}\right)^3\right] \text{ for } k = 0, 1, 2, \ldots, 255 \quad (32)$$

The results of tonal correction are usually satisfactory. However, when applying this technique, different types of transformation functions are required to process different classes of low-contrast images, as shown in the above examples. Furthermore, in order to generate satisfactory results, the power parameter in the power-law transformation functions often needs to be adjusted by the user. Therefore, the tonal correction technique is basically neither a general method nor an automatic method.

Figure 31A:
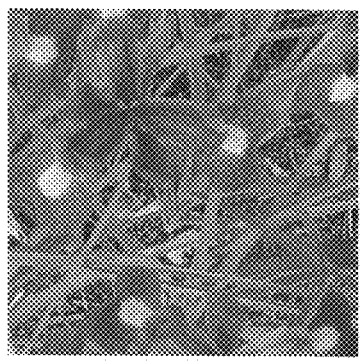
FIG. 31A is a flat color image.
Figure 31B:
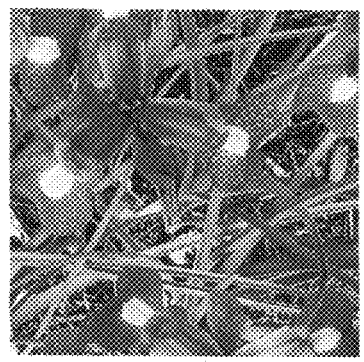
FIG. 31B is modification of the image of FIG. 31A using tonal correction.
Figure 31C:
FIG. 31C is an enhancement of the image of FIG. 31A produced using an HSI model of the basic gray-level grouping (GLG) process.
Figure 31D:
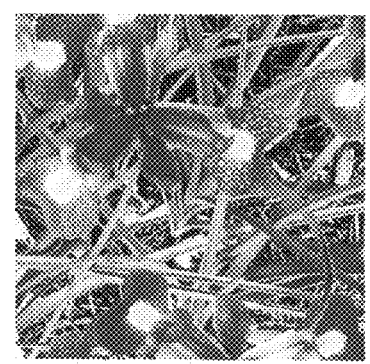
FIG. 31D is an enhancement of the image of FIG. 31A produced using an RGB model of the basic gray-level grouping (GLG) process.
Figure 32C:
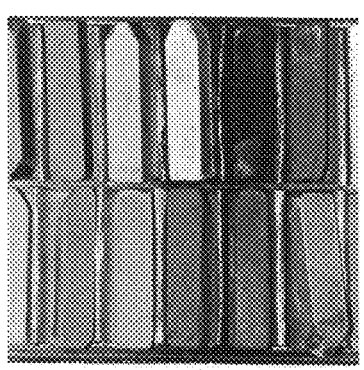
FIG. 32C is an enhancement of the image of FIG. 32A produced using an HSI model of the basic gray-level grouping (GLG) process.
Figure 32D:
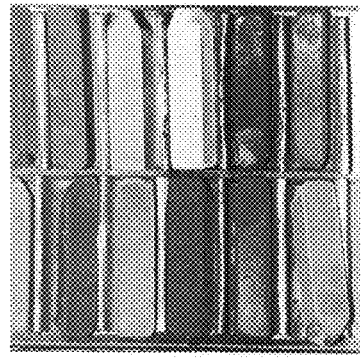
FIG. 32D is an enhancement of the image of FIG. 32A produced using an RGB model of the basic gray-level grouping (GLG) process.
Figure 33C:
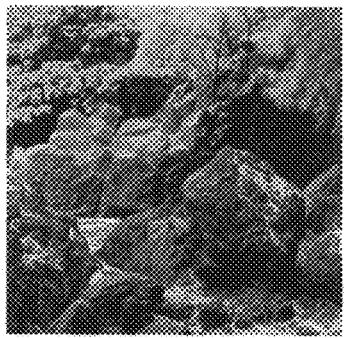
FIG. 33C is an enhancement of the image of FIG. 33A produced using an HSI model of the basic gray-level grouping (GLG) process.
Figure 33D:
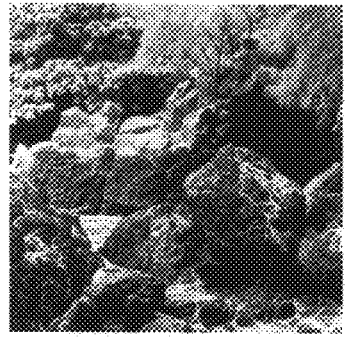
FIG. 33D is an enhancement of the image of FIG. 33A produced using an RGB model of the basic gray-level grouping (GLG) process.

FIG. 31C, FIG. 32C and FIG. 33C are the gray-level grouping results using the HSI color model, and FIG. 31D, FIG. 32D and FIG. 33D are the GLG results using the RGB color model. The gray-level grouping technique is able to enhance different classes of low-contrast color images effectively and fully automatically. It is also noted that, in certain GLG results using the RGB color model, there are some color distortions due to the fact that the hue information is not preserved in the treatment (e.g., FIG. 31D and FIG. 32D), but the resulting contrast is often higher and the images are more colorful and usually more aesthetically pleasing. The tonal correction technique usually also causes color distortions. Therefore, for applications requiring color preservation, it is recommended to use GLG with the HSI color model, which will enhance contrast and preserve color fidelity.

Figure 35A:
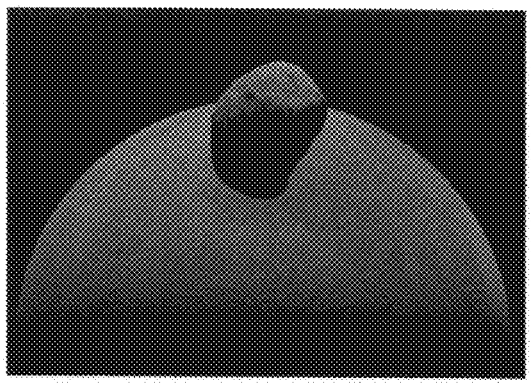
FIG. 35A is an image of Mars and Phobos.
Figure 35B:
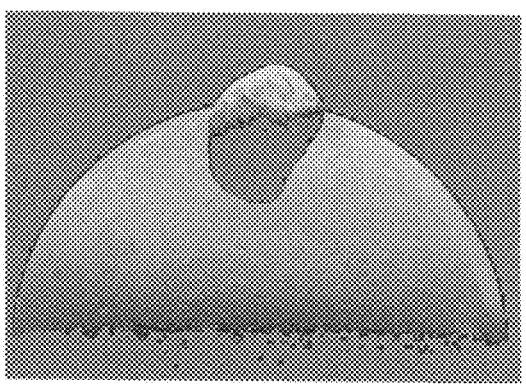
FIG. 35B is a modification of the image of FIG. 35A produced by histogram equalization (HE)
Figure 35C:
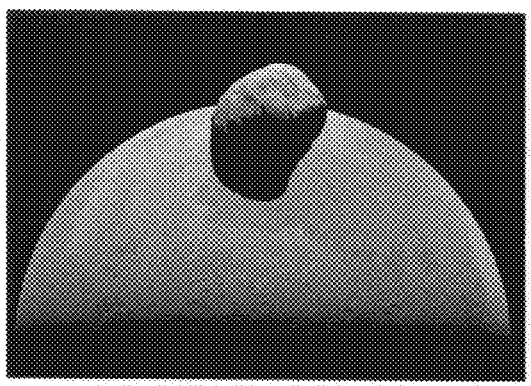
FIG. 35C is a modification of the image of FIG. 35A produced by using the "Auto Contrast" function of Photoshop®.

FIG. 35A shows a low-contrast color image of Mars and Phobos. FIG. 35B shows the result of histogram equalization. It obviously has a washed-out appearance and undesirable artifacts along the edges of Mars and Phobos. This HE result is not acceptable for most application purposes. FIG. 35C shows the result of the most popular image processing software, Photoshop®, using its "Auto Contrast" function. The result looks reasonably satisfactory. The "Auto Contrast" command of Photoshop® to automatically adjusts highlights and shadows to fix poor image contrast. It is believed that the Auto Contrast command adjusts poor image contrast based on pixel luminosity, which it calculates based on a weighted average of the RGB values. It is understood to disregard the first 0.5 percent of the range of white and black pixels to ensure that it gets representative image areas, and maps the lightest pixels in the clipped range to white and the darkest pixels to black. Highlights then look lighter and shadows darker, for finer overall image contrast.

Figure 35D:
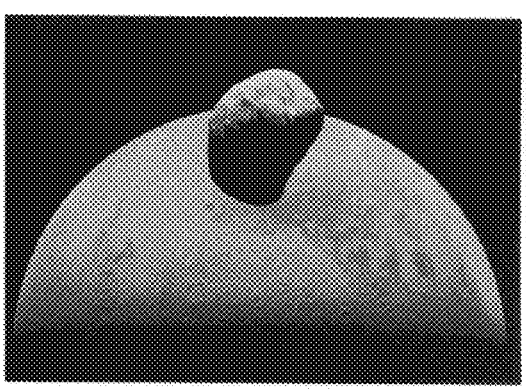
FIG. 35D is an enhancement of the image of FIG. 35A produced using an HSI model of the basic gray-level grouping (GLG) process.
Figure 35E:
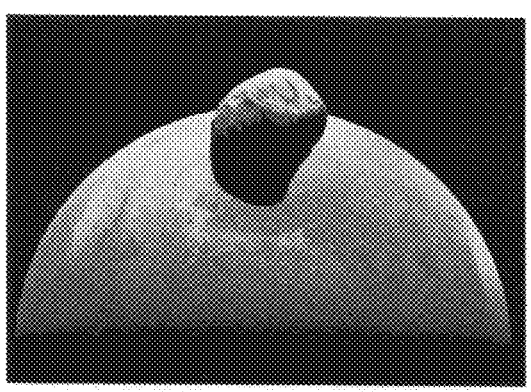
FIG. 35E is an enhancement of the image of FIG. 35A produced using an RGB model of the basic gray-level grouping (GLG) process.

FIG. 35D shows the GLG result using the HSI color model, which is much more satisfactory than the HE result (FIG. 35B) and also better than the Photoshop® result (e.g., the black regions on Mars surface on FIG. 35C). FIG. 35E shows the GLG result using the RGB color model. It can be noted that, although there are some color distortions, the slight color differences between different regions of Mars have been amplified in this result, and this makes the RGB-color-model result more desirable than that of the HSI color model for certain applications such as scientific visualization. It is also notable that the RGB-color-model result is more aesthetically pleasing. The Tenengrad values of the images also confirm that the GLG results are better than those of the other two methods, as presented in Table 7.

TABLE 7

| FIG. No. | Tenengrad value (TEN) |
|---|---|
| 35A | $1.2 \times 10^3$ |
| 35B | $3.2 \times 10^4$ |
| 35C | $3.5 \times 10^3$ |
| 35D | $4.1 \times 10^3$ |
| 35E | $4.1 \times 10^3$ |

Table 8 summarizes various (S)GLG related techniques and the classes of low-contrast images that can be enhanced by (S)GLG techniques. It is worth noting that it is possible to develop an algorithm to automatically select a sample patch of background for most low-contrast images with noisy backgrounds by analyzing the histogram profile of the sample patch. In most circumstances, if the histogram profile is perfectly Gaussian or symmetric, it is very likely that the sample patch contains only the noisy background. Therefore, the (S)GLG variations with background noise removal may also be conducted with full automation.

TABLE 8

| Type of images and application purposes | Technique | Degree of automation |
|---|---|---|
| 1. Enhance general low-contrast images (no noise or low noise) | (a) Basic gray-level grouping (GLG) | Full automation |
| 2. Enhance low-contrast images with large noisy backgrounds | (b) Selective gray-level grouping (SGLG) | Full automation |
| 3. Enhance dark area of low-contrast images | | User needs to specify the grayscale breakpoint and |
| 4. Enhance light area of low-contrast images | | its new location on the grayscale. |

TABLE 8-continued

| Type of images and application purposes | Technique | Degree of automation |
|---|---|---|
| 5. Enhance low-contrast images with small noisy backgrounds or images with so noisy backgrounds that the amplitudes of background histogram components are not much higher than the rest of the histogram. | (c) (m)GLG with background noise removal i) Method 1 - background subtraction ii) Method 2 - statistical averaging | User needs to select a sample patch of the noisy background. If a sample patch of the noisy background can be automatically selected, the two methods are then fully automatic. |
| 6. Enhance low-contrast color images with color preservation | (d) (S)GLG on color images - using HSI color model | |
| 7. Enhance low-contrast color images for more appealing visual appearance or scientific visualization | (e) (S)GLG on color images - using RGB color model | Full automation if the low-contrast image has no noise or low noise, or the noisy background is large; If the application is to enhance the dark area or light area of an image, user needs to specify the grayscale breakpoint and its new location on the grayscale. |
| 8. Enhance low-contrast images with fine details | (f) Adaptive (S)GLG | |
| 9. Enhance low-contrast images with fine details and preserve the relative brightness of one part of the image with respect to that of the rest of the image. | (g) Contrast-limited adaptive (S)GLG | |

As noted previously herein, it is desirable in the GLG methods to group the histogram of gray levels into "a proper number of gray level bins." In the more preferred embodiments, the average distance between pixels ($D_{n-1}$) is used as the criterion for comparing contrast of different enhancements of an image. That is, the allocation of histogram components into bins that maximizes $D_{n-1}$ determines the proper (i.e., optimal, for best image enhancement) number of bins. Alternatively, the maximization of the total distance between pixels ($T_{n-1}$) may be used as the criterion for determining the proper number of bins. The total distance between pixels on the grayscale is given by the expression below:

$$T_{n-1} = \sum_{i=0}^{M-2} \sum_{j=i+1}^{M-1} H_{n-1}(i) H_{n-1}(j)(j-i), \qquad (33)$$

for i, j ∈[0, M−1]

where [0, M−1] is the gray level range of the grayscale.

There are also other criteria that may be used in selecting the proper number of bins. For example, since the goal of the GLG method is to achieve contrast enhancement, any other image contrast criteria or image sharpness criteria may be useful to judge the quality of the GLG resulting image, and hence determine which number of gray level bins is the best. If another criterion is used, then for each number of gray level bins, the GLG resulting image should be generated and the criterion should be applied on it, then the image with the highest contrast or sharpness indicated by the criterion should be kept as the optimal GLG result. This method works in principle, but it may take a much longer computation time because for each possible number of gray level bins, the GLG resulting image must be generated and then the criterion must be applied to each generated image. For the GLG method using pixel distance (either average or total) as the criterion, no GLG image need be generated until the optimal number of gray level bins is found. Also, in some cases, different contrast or sharpness measures may not agree with each other, and give different results. Therefore, if different criteria are used in the above procedure, they might give different optimal number of gray level bins. If the average or total pixel distance on grayscale is used as the criterion for the GLG process to determine the optimal number of gray level bins, there is no need to generate a GLG resulting image for each alternative number of gray level bins, because the criterion of average or total pixel distance is applied on the image histogram that directly results from each GLG process; the criterion is NOT applied on the image itself. However, other general image contrast or image sharpness criteria (e.g., Tenengrad criterion) are applied directly on the image itself, thus a GLG resulting image for each alternative number of gray level bins must be generated if other criteria are used to determine the optimal number of bins In processing color images, a method of comparing the maximal total distances between pixels on grayscale of the three color channels to determine which color constituent is most enhanced, and then using the corresponding transformation function to treat all color constituents has been previously described herein. There are other methods for enhancing the three channels that may be used. One alternative method is to enhance all three channels with their own optimal number of gray level bins, so every channel is enhanced optimally. However, results of this method generally have more color distortions than those of the method described above. Although this effect is not desirable in many cases, it might be desirable in some cases because there are more colors in the results. Another possible alternative method is to use a default number, e.g., 20, of gray level bins to enhance all three RGB channels, to save on computational costs. The results of this method will generally also have some color distortions.

It should be noted that the GLG methods described heretofore, whether the global GLG or adaptive GLG, are of single scale. A comparative advantage of the global GLG method is that the brightness balance over the entire image is good; the disadvantage is that local contrast may not be increased, or even be reduced in some regions of the image, causing the blurring effect or even the loss of details. A comparative advantage of the adaptive GLG method is that local contrast enhancement is high over the entire image; the disadvantage is that the brightness balance over the entire image is bad—the brightness is almost the same everywhere so that the resulting image doesn't look real, because images have shadows, dark areas, etc. Based on the characteristics of the global GLG and adaptive GLG, the single-scale GLG methods may be extended to a multi-scale approach to combine the advantages of global GLG and adaptive GLG, but avoid the disadvantages of them. One approach to multi-scale gray-level grouping (MSGLG) is given by the following expression, $$I_{MS} = \sum_i w_i I_i \quad (34)$$

where $I_{MS}$ is the multi-scale GLG output image, $I_i$ is the ith-scale GLG output image, and $w_i$ is the corresponding weight. Different ith-scale GLG output images are adaptive GLG output images obtained by using sub-image arrays of different dimensions. The global GLG resulting image may be considered as the $1^{st}$-scale GLG output. The process of generating a multi-scale GLG result from multiple single-scale GLG outputs is basically the fusion of multiple images; therefore, all image fusion techniques in addition to the approach given above can be used for this purpose.

As previously indicated, the GLG methods described herein are generalized and apply to a wide range of imaging types. Various specialized imaging applications may benefit from supplementary processing in conjunction with GLG processing. For example, X-ray luggage inspection systems used at airports, court rooms, federal buildings, etc. often have specialized imaging systems that are designed to enhance the visibility of certain materials such as metals and light chemical elements that are used in explosives. Such systems utilize X-rays of two different energies. The high-energy X-ray is generated with a high anode voltage over 100 kV, and the low-energy X-ray is generated with a low anode voltage around 80 kV. When high-energy X-rays penetrate objects, the energy absorption depends primarily on the material's density. The higher the density is, the higher the energy absorption by the object, and hence the darker the image. For low-energy X-rays, however, the energy absorption depends primarily on the effective atomic number of the material as well as the thickness of the object. Therefore, areas of high density materials such as metal are dark in both low and high-energy X-ray images, but areas of lighter elements show as darker regions in low-energy images compared to high-energy images. As a result, light elements in dynamites, for instance, (e.g., carbon, nitrogen and oxygen) may be detected by comparing the low-energy X-ray image with the high-energy X-ray image of the same scene.

In some cases these inspection devices fuse a low-energy X-ray image and a high-energy X-ray image into a single image which may help interpret the content of luggage. A limitation on conventional transmission X-ray imaging systems is their incapability to differentiate between a thin sheet of a strong absorber and a thick slab of a weak absorber. This problem is usually solved in dual-energy X-ray systems by estimating the atomic number of material. However, the accuracy of estimating the effective atomic number of materials in luggage is often difficult, and as a result these systems may generate false alarm rates are as high as 20% or more.

In an effort to decrease false alarm rates in commercial dual-energy X-ray luggage inspection systems, a combinational scheme may be used to fuse, de-noise and enhance dual-energy X-ray images to make them more amenable to post processing or interpretation by screeners. First, a wavelet-based method is used to fuse the dual-energy X-ray images. This algorithm not only incorporates unique information from each of the source images into the fused image, but also emphasizes information of interest which has been exhibited in both source images. A noise reduction technique is then used to remove background noise from the fused X-ray image. In this step, the histogram profile of the noisy background may be subtracted from the histogram of the fused image, and the resulting histogram processed with a novel enhancement technique. The final image contains complementary information from both source images, is substantially background-noise-free and contrast-enhanced, and is therefore very suitable to better interpretation and a reduction in false alarm rates associated with most X-ray luggage inspection systems.

One general procedure of wavelet-based image fusion may be described as follows:
 (1) Registered source images are each transformed into corresponding wavelet coefficient images using the discrete wavelet transform (DWT);
 (2) By following a fusion rule, the fused wavelet coefficients are computed from the corresponding wavelet coefficients of the source images; and
 (3) The inverse DWT (IDWT) is applied to the fused wavelet coefficients to reconstruct the fused image.

Fusion rules play an important role in wavelet-based image fusion. There are two commonly adopted classes of fusion rules—pixel-based rules and region-based rules. For pixel-based fusion rules, the value of a fused wavelet coefficient is determined by the corresponding wavelet coefficients of the source images. Region-based fusion rules use the corresponding wavelet coefficients of the source images as well as their surrounding wavelet coefficients to define the fused wavelet coefficients.

In most embodiments, a pixel-based fusion algorithm is employed to effectively improve the threat detection rate of dual-energy X-ray luggage inspection systems. In this method, a low-pass filter is first applied to the approximation coefficients of the two source images respectively, generating the approximation coefficients of the fused image.

Next, the corresponding detail coefficients of the two source images are summed to create the detail coefficients of the fused image. The resulting approximation coefficients and detail coefficients are then used to reconstruct the fused image.

Assuming that L denotes the low-energy X-ray image of a given luggage scene, H the corresponding high-energy X-ray image, and F the resulting fused image. A typical embodiment of the wavelet-based image fusion method is as follows:
 1) Obtain wavelet decompositions of L and H, respectively. In order to perform DWT on L and H to obtain their decompositions, a wavelet family and a wavelet basis capable of representing image details need to be selected. A practical selection rule in image processing applications is to use a wavelet basis that can represent enough detail variations, regardless of its wavelet family. Another issue to be determined is how many scales are necessary for the decomposition. Too few scales will cause the loss of too many details in the fused image, and too many scales will result in a rough fused image which is difficult for screeners to interpret. Therefore, a compromise on the number of scales is necessary to obtain a high-quality fused image. We conducted multiple experiments on dual-energy X-ray images that showed that four scales generally yield good results.

2) Apply a low-pass filter to the approximation coefficients of L and H, respectively, to generate the approximation coefficients of the fused image. The idea behind this step is that a smooth approximation of a given scene can make important features in the scene more easily discernable. Specifically, we generate each of the approximation coefficients of the fused image, F, by averaging the corresponding approximation coefficients of L and H, as given in Eq. 35.

$$W_{\varphi F} = \frac{1}{2}(W_{\varphi L} + W_{\varphi H}), \quad (35)$$

where $W_{\varphi F}$, $W_{\varphi L}$ and $W_{\varphi H}$ are the approximation coefficients of F, L and H, respectively.

3) Combine the corresponding detail coefficients of L and H to obtain the detail coefficients of the fused image, F. The objective of this step is to incorporate unique details from either L or H into the fused image and also make details existing in both images more prominent in the resulting image. We calculate the detail coefficients at all decomposition scales of the fused image by summing the corresponding detail coefficients of L and H as given in Eq. 36.

$$W_{\psi F} = W_{\psi L} + W_{\psi H}, \quad (36)$$

where $W_{\psi F}$, $W_{\psi L}$ and $W_{\psi H}$ the detail coefficients of F, L and H, respectively.

4) Construct the fused image F by performing IDWT using the approximation coefficients and detail coefficients obtained in Steps 2 and 3, respectively.

Figure 36A:
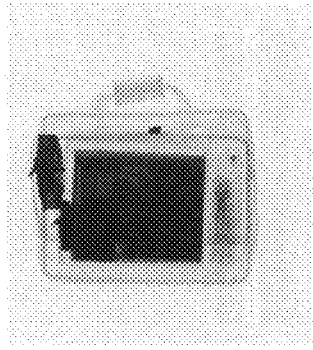
FIG. 36A is a low-energy X-ray image of a travel case.
Figure 36B:
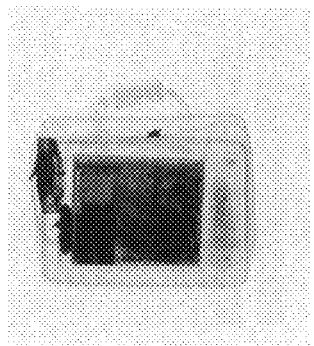
FIG. 36B is a high energy X-ray image of a travel case.
Figure 36C:
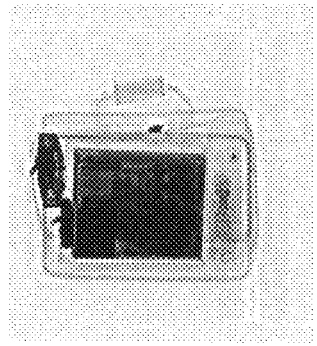
FIG. 36C is a wavelet-based fusion combination of the images of FIGS. 36A and 36B.
Figure 36D:
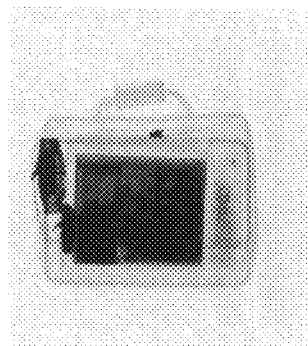
FIG. 36D is an arithmetic average of FIGS. 36A and 36B.
Figure 37A:
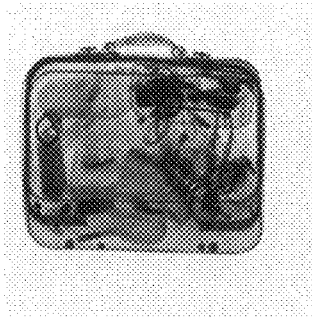
FIG. 37A is a low-energy X-ray image of a suitcase.
Figure 37B:
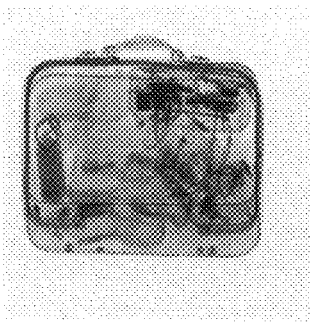
FIG. 37B is a high-energy X-ray image of a suitcase.
Figure 37C:
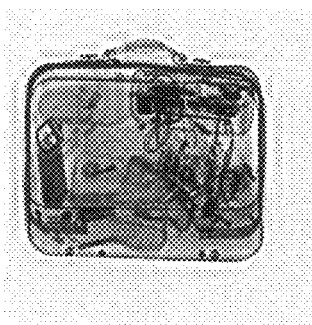
FIG. 37C is a wavelet-based fusion image combining the images of FIGS. 37A and 37B.
Figure 37D:
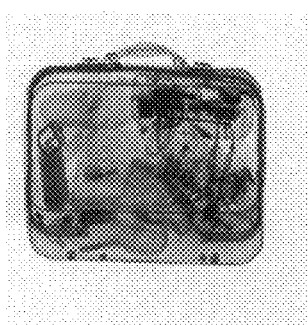
FIG. 37D is an arithmetic average of FIGS. 37A and 37B.
Figure 38A:
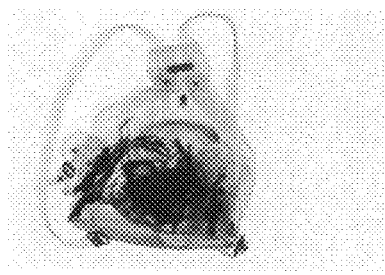
FIG. 38A is a low-energy X-ray image of a backpack.
Figure 38B:
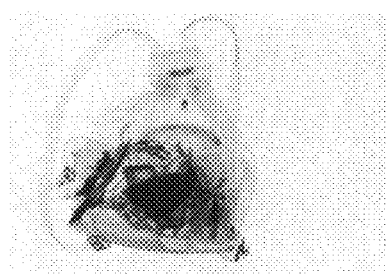
FIG. 38B is a high-energy X-ray image of a backpack.
Figure 38C:
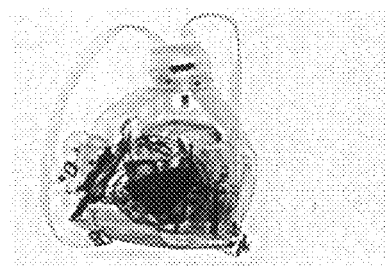
FIG. 38C is a wavelet-based fusion image combining the images of FIGS. 38A and 38B.
Figure 38D:
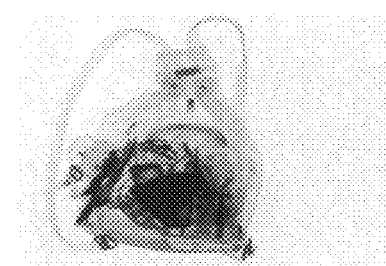

FIGS. 36A and B, FIGS. 37A and B, and FIGS. 38A and B show examples of original dual-energy X-ray images. FIG. 36C, FIG. 37C and FIG. 38C show their fusion results obtained by applying the wavelet-based fusion algorithm described above. For the purpose of comparison, we also used the arithmetic average to fuse these X-ray images, and the results are shown in FIG. 36D, FIG. 37D and FIG. 38D. The wavelet-based fusion results reveal more details of the luggage content and have better contrast. However, the wavelet-based fusion operation may cause a ghosting effect in the fused image, as shown in FIG. 36C, FIG. 37C and FIG. 38C around the contour of the luggage. The averaging fusion results do not have this undesirable ghosting effect, but they are not as sharp as the wavelet-based fusion results. The ghosting effect and noisy background on the wavelet-based fused images can be minimized by the de-noising operation introduced subsequently herein.

Multi-sensor images generally have noisy backgrounds, such as seen on the original X-ray images in FIGS. 36, 37 and 38 (A-D). Although the fused images generally reveal more detail information, the background noise still exists in them, and is even amplified, making further processing and interpretation of these images difficult. Therefore, a de-noising operation is needed for the overall scheme to yield good enhancement and fusion results. A de-noising method is provided in some embodiments to remove the background noise in fused X-ray luggage images. This method is based on background subtraction, as follows.

Figure 39A:
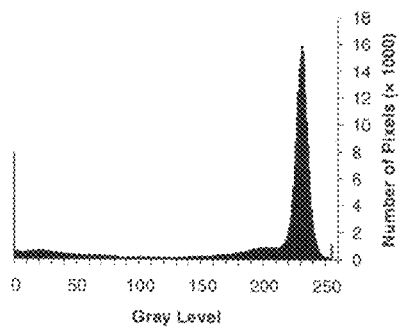
FIG. 39A is the gray-level histogram of image components in the image of FIG. 36C.
Figure 39B:
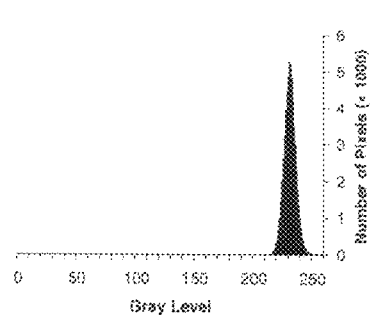
FIG. 39B is the histogram of a sample patch of the noisy background of the image of FIG. 36C.
Figure 39C:
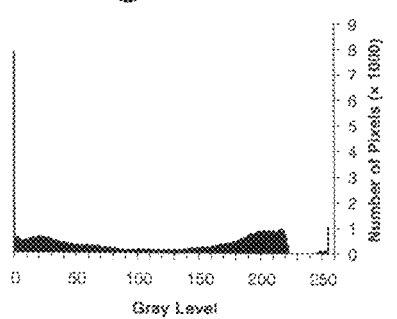
FIG. 39C is the gray-level histogram of image components resulting from subtracting the histogram of FIG. 39B from the histogram of FIG. 39A.

FIG. 39A depicts the histogram of FIG. 36C, which is a wavelet-based fusion image. A sample patch of the noisy background in the fused image is selected and its histogram, $H_B(k)$, is obtained as shown in FIG. 39B. Note that with such images, it is easy to automate this background patch selection since such images are mainly formed by the luggage in the center and the background around. The background patch can be selected as one of the image corners. The histogram of the noisy background patch is then rescaled and subtracted from the histogram of the original fused image shown in FIG. 39A as described by the following equation:

$$H(k) = \begin{cases} 0, & \text{if } H_O(k) - \frac{N_O}{N_B}\beta \cdot H_B(k) < 0 \\ H_O(k) - \frac{N_O}{N_B}\beta \cdot H_B(k), & \text{otherwise} \end{cases} \quad (37)$$

for k=0, 1, . . . , M−1.

where $H_O(k)$ is the histogram of the original image, $N_O$ is the number of pixels in the original image, $N_B$ is the number of pixels in the sample patch of the noisy background, and $\beta$ is a coefficient which properly adjusts the amplitude of $H_B(k)$ and assumes a value of 0.9 in our experiments. This coefficient helps minimize the amount of foreground information subtracted with the background where they both overlap on the histogram. The resulting modified histogram, H(k), is shown in FIG. 39C. It can be seen that the histogram components corresponding to the noisy background have been eliminated and that other foreground histogram components once overlapped with the background have also been restored. FIG. 39B shows that the noisy background histogram spans over a gray-level interval [215, 250] but the corresponding empty gray-scale segment in FIG. 39C, with the background histogram removed, spans over a narrower gray-level interval [223, 247].

The background-subtracted histogram shown in FIG. 39C may then be used to design a gray-level transformation function to create the resulting image. Since background subtraction leaves an empty segment on the grayscale, it is then desirable to employ a histogram-based enhancement technique to fully utilize the grayscale and further enhance the wavelet-based fusion output while reconstructing the final de-noised image. This enhancement and reconstruction technique is briefly described as follows.

Figure 39D:
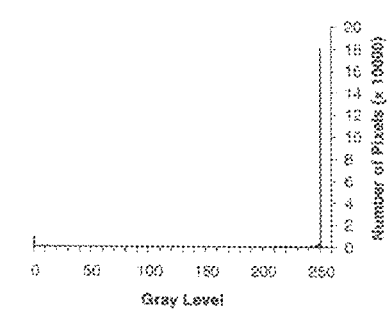
FIG. 39D is the gray-level histogram of image components produced by applying a gray-level grouping (GLG) process on the histogram of FIG. 39C.
Figure 40A:
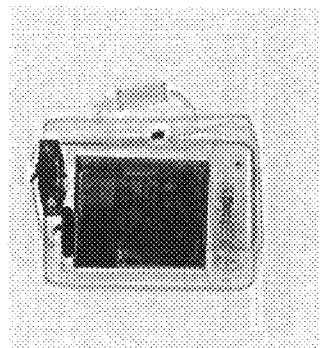
FIG. 40A is the same as FIG. 36C, reproduced in proximity to FIG. 40B for ease of comparison.
Figure 40B:
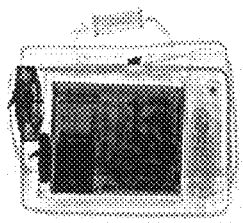
FIG. 40B illustrates the results of de-noising and GLG processing applied to the image of FIG. 40A.
Figure 40C:
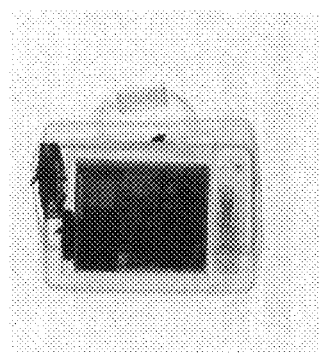
FIG. 40C is the same as FIG. 36D, reproduced in proximity to FIG. 40D for ease of comparison.
Figure 40D:
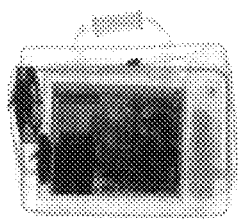
FIG. 40D illustrates the results of de-noising and GLG processing applied to the image of FIG. 40C.

FIG. 40A depicts the wavelet-based fusion image of FIG. 36C reproduced here for ease of comparison. A histogram-based enhancement technique is applied to the background-subtracted histogram, H(k), to obtain a gray-level transformation function that can be used to de-noise and enhance the original fused image. The application of gray-level grouping (GLG) to reconstruct a noise-free and enhanced fused X-ray luggage image results in the image shown in FIG. 40B, and its corresponding histogram in FIG. 39D. The histogram of the resulting image indicates that the background noise has been substantially removed. Since their amplitudes are too small when compared to the background histogram, the foreground histogram components are almost indiscernible in FIG. 39D. It is noted that the resulting image is not only background-noise-free, but also contrast-enhanced, revealing more details of the luggage content. FIG. 40C depicts the arithmetic average image of FIG. 36D reproduced here for ease of comparison. FIG. 40D illustrates the results of de-noising and GLG processing applied to the image of FIG. 40C.

Figure 41A:
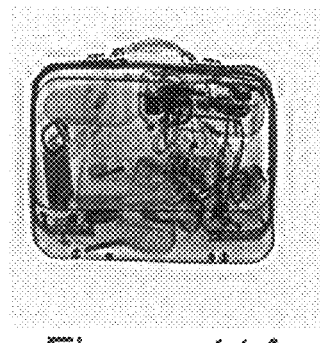
FIG. 41A is the same as FIG. 37C, reproduced in proximity to FIG. 41B for ease of comparison.
Figure 41B:
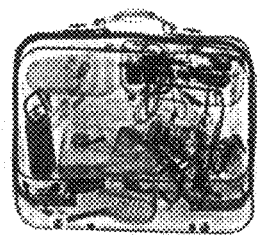
FIG. 41B illustrates the results of de-noising and GLG processing applied to the image of FIG. 41A.
Figure 41C:
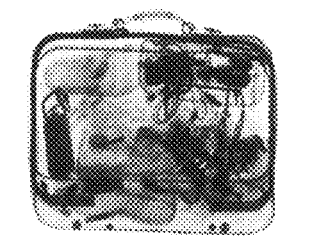
FIG. 41C is the same as FIG. 37D, reproduced in proximity to FIG. 410D for ease of comparison.
Figure 41D:
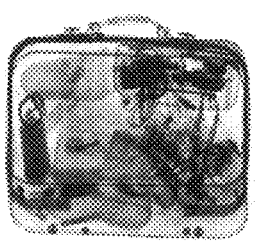
FIG. 41D illustrates the results of de-noising and GLG processing applied to the image of FIG. 41C.

FIG. 41A depicts the wavelet-based fusion image of FIG. 37C reproduced here for ease of comparison. FIG. 41B illustrates the results of de-noising and GLG processing applied to the image of FIG. 41A. FIG. 41C depicts the arithmetic average fusion image of FIG. 37D reproduced here for ease of comparison. FIG. 41D illustrates the results of de-noising and GLG processing applied to the image of FIG. 41C.

Figure 42A:
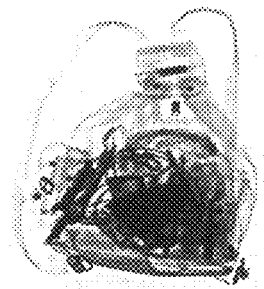
FIG. 42A is the same as FIG. 38C, reproduced in proximity to FIG. 42B for ease of comparison.
Figure 42B:
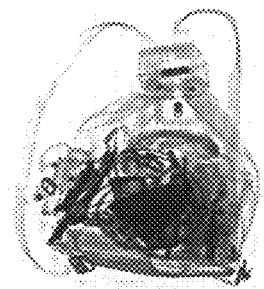
FIG. 42B illustrates the results of de-noising and GLG processing applied to the image of FIG. 42A.
Figure 42C:
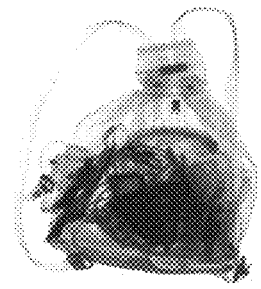
FIG. 42C is the same as FIG. 38D, reproduced in proximity to FIG. 42D for ease of comparison.
Figure 42D:
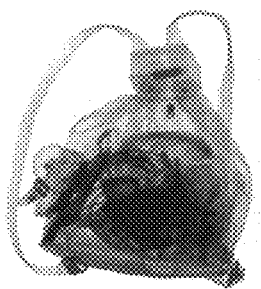
FIG. 42D illustrates the results of de-noising and GLG processing applied to the image of FIG. 42C.

FIG. 42A depicts the wavelet-based fusion image of FIG. 38C reproduced here for ease of comparison. FIG. 42B illustrates the results of de-noising and GLG processing applied to the image of FIG. 42A. FIG. 42C depicts the arithmetic average fusion image of FIG. 38D reproduced here for ease of comparison. FIG. 42D illustrates the results of de-noising and GLG processing applied to the image of FIG. 42c.

Generally there is not much difference between the results obtained by altering the order of the fusion and de-noising operations and both of them are satisfactory. However, since the fusion operation may cause a ghosting effect in the fused image around the contour of the luggage, it is sometimes desirable to perform the fusion operation first, then the de-noising operation to minimize this ghosting effect. Also, if the de-noising and enhancement operations are executed first, the computational cost will generally be higher with two images being processed instead of one.

Figure 43:
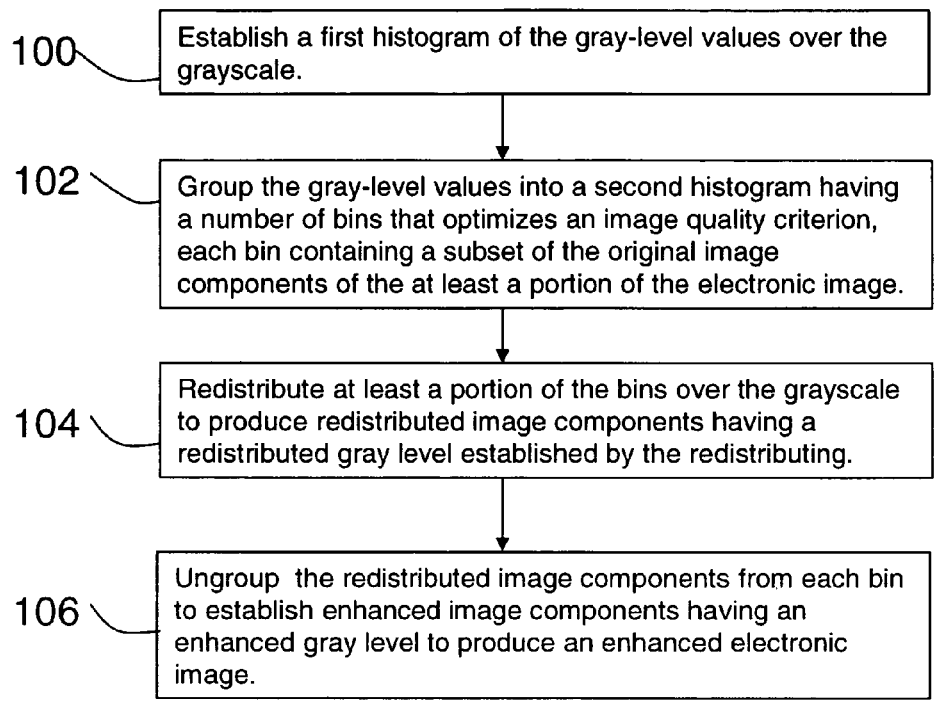
FIG. 43 illustrates a flow chart of a basic gray-level grouping method embodiment.

FIG. 43 summarizes steps of a basic gray-level grouping method embodiment for application with at least a portion of an electronic image having a plurality of original image components, where each original image component has one of a plurality of original gray-level values that are distributed over a grayscale. In step 100 a first histogram of the gray-level values over the grayscale is established. In step 102 the gray-level values are grouped into a second histogram having a number of bins that optimizes an image quality criterion, each bin containing a subset of the original image. According to step 104, at least a portion of the bins are redistributed over the grayscale to produce redistributed image components having a redistributed gray level established by the redistributing. In step 106, the redistributed image components are ungrouped from each bin to establish enhanced image components having an enhanced gray level to produce an enhanced electronic image.

Figure 44:
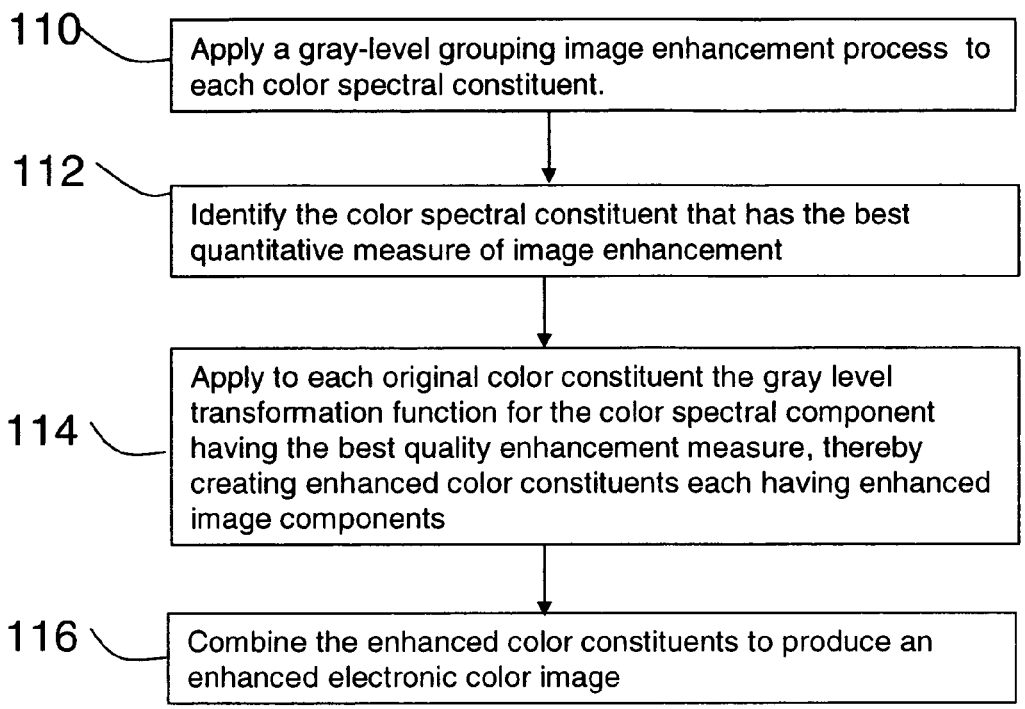
FIG. 44 presents a flow chart of a first method embodiment for enhancing the quality of an electronic color image.

FIG. 44 summarizes steps of a first method embodiment for enhancing the quality of at least a portion of an electronic color image that has a plurality of original image components, where each original image component has at least two original color spectral constituents, and each original color spectral constituent has one of a plurality of gray-level values that are distributed over a grayscale. Examples of color spectral constituents are the "R," "B," and "G" (red, blue and green) color channels in image processing system. A characteristic of a spectral constituent is that it has a gray-level or quasi-gray-level characteristic that permits the image components (e.g. pixels) to be processed by a gray-level grouping method. In step 110 a gray level grouping image enhancement process is applied to each color spectral constituent. In preferred embodiments the gray-level grouping image enhancement process begins with establishing a first histogram of the gray-level values over the grayscale for the color spectral constituent. The process proceeds with grouping the gray-level values for the color spectral constituent into a second histogram having a proper number of bins according to a criterion that establishes a quantitative measure of image enhancement, each bin containing a subset of the original image color spectral components of the at least a portion of the electronic color image. Then the bins are redistributed over the grayscale. The gray-level grouping image enhancement process continues by deriving a gray level transformation function and ungrouping the subset of original image components from each bin according to the transformation function to produce an enhanced color spectral constituent.

In step 112 of the method embodiment of FIG. 44 the color spectral constituent that has the best quantitative measure of image enhancement is identified, and then in step 114, the gray level transformation function for the color spectral component having the best quality enhancement measure, is applied to each original color constituent, thereby creating enhanced color constituents each having enhanced image components. Then in step 116, the enhanced color constituents are combined to produce an enhanced electronic color image.

FIG. 45 illustrates a second method embodiment for enhancing the quality of at least a portion of an electronic color image having a plurality of original image components, where each original image component has a hue value, a saturation value, and an intensity value, and where the intensity value has one of among a plurality of intensity values distributed over an intensity range. The method begins in step 120 with applying a gray-level grouping image enhancement process to the intensity values of the image components. In most embodiments the gray-level grouping image enhancement process begins with establishing a first histogram of the intensity values over the intensity range. the gray-level grouping image enhancement process continues with a step of grouping the intensity values into a second histogram having a proper number of bins according to a criterion that establishes a quantitative measure of image enhancement, where each bin contains a subset of the original image components of the at least a portion of the electronic image. The gray-level grouping image enhancement process then proceeds with redistributing the bins over the intensity range. Subsequent step of the gray-level grouping image enhancement process are deriving an intensity transformation function and then ungrouping the subset of original image components from each bin according to the transformation function to produce an enhanced intensity value for each image component.

In step 122 of the method embodiment of FIG. 45 the enhanced intensity value for each original image component is combined with the hue value and the saturation value for each original image component to produce enhanced image components in an enhanced electronic color image.

FIG. 46 illustrates a method embodiment for producing an enhanced electronic image. In step 130 a fused image is generated from a plurality of source images. In step 132, an image enhancement process is applied to the fused image. The image enhancement process includes (1) noise removal by background subtraction, (2) noise removal by statistical subtraction, or (3) contrast enhancement by gray-level grouping.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for enhancing the quality of at least a portion of an electronic image comprising a plurality of original image components, each original image component having one of a plurality of original gray-level values that are distributed over a grayscale, the method comprising:

using a processor to perform the steps of:
(a) establishing a first histogram of the gray-level values over the grayscale;
(b) grouping the gray-level values into a second histogram having a number of bins that optimizes an image quality criterion, each bin containing a subset of the original image components of the at least a portion of the electronic image;
(c) redistributing at least a portion of the bins over the grayscale to produce redistributed image components having a redistributed gray level established by the redistributing; and
(d) ungrouping the redistributed image components from each bin to establish enhanced image components having an enhanced gray level to produce an enhanced electronic image.

2. The method of claim 1 wherein the image quality criterion comprises the average distance on the grayscale between the original image components in the second histogram.

3. The method of claim 1 wherein the image quality criterion comprises the total distance on the grayscale between original image components in the second histogram.

4. The method of claim 1 wherein step (b) comprises grouping the gray-level values into a second histogram having a default number of bins between about 4 and about 150 in number.

5. The method of claim 1 wherein the image quality criterion comprises an approximate equality between the numbers of original image components in each bin.

6. The method of claim 1 wherein step (c) further comprises redistributing the bins substantially uniformly over the grayscale.

7. The method of claim 1 wherein step (c) further comprises redistributing the bins over the grayscale so that each bin occupies a grayscale segment of approximately the same size.

8. The method of claim 1 wherein step (d) further comprises deriving a gray level transformation function and applying the gray level transformation function to produce the enhanced image.

9. The method of claim 1 further comprising the steps:
dividing the at least a portion of the electronic image into an array of sub-images;
processing each sub-image according to the steps (a) through (d); and
merging the processed sub-images together using bilinear interpolation to produce the enhanced image.

10. The method of claim 1 further comprising the steps:
dividing the grayscale into a plurality of segments, with each pair of adjoining segments establishing a pair division point;
specifying new gray-level values at each pair division point;
processing each segment according to steps (a) through (d).

11. The method of claim 1 wherein the following steps are performed prior to step (b):
establishing a noisy histogram $H_B(k)$ of a plurality of noisy image components selected from the original image components over a noisy portion of the electronic image, each noisy image component having a noisy gray-level value (k);
rescaling the noisy histogram $H_B(k)$ and subtracting the rescaled noisy histogram from the first histogram to yield a de-noised histogram $H(k)$ according to the equation $$H(k) = \begin{cases} 0, & \text{if } H_I(k) - \frac{N_I}{N_B}\beta \cdot H_B(k) < 0 \\ H_I(k) - \frac{N_I}{N_B}\beta \cdot H_B(k), & \text{otherwise} \end{cases}$$

for k=0, 1, . . . , M−1.
where $H_I(k)$ is the first histogram, $N_I$ is the number of the original image components, $N_B$ is the number of the noisy image components, and $\beta$ is a coefficient that scales the amplitude of $H_B(k)$ to approximately the amplitude of $H_I(k)$; and
re-establishing the first histogram of gray-level values over the grayscale range based on the de-noised histogram.

12. The method of claim 1 wherein the following steps are performed before step (b):
(1) establishing an iteration count equal to one;
(2) defining a noisy grayscale range within the first histogram;
(3) defining a set of noisy original image components within the noisy grayscale range of the first histogram;
(4) analyzing the set of noisy original image components to determine a first noise statistical central tendency and a first noise statistical variance;
(5) creating an artificial image having a plurality of artificial image components spatially equivalent and equal in number to the set of noisy image components, each artificial image component having a gray-level value equal to the first noise statistical central tendency;
(6) corrupting the artificial image by an artificial noise to create noisy artificial image components each having a noisy artificial image component gray level, the noisy artificial image components having an artificial noise statistical central tendency that is equal to the first noise statistical central tendency and having an artificial noise statistical variance that equal to the first noise statistical variance;
(7) combining the noisy artificial image components and the original image components to create an intermediate image having a set of corresponding intermediate image components that includes a set of noisy intermediate image components within the noisy grayscale range of the first histogram, the combining step comprising:
(a) if the gray-level value of an image component in the set of original image components is within the noisy range of the histogram, the gray-level value of the corresponding intermediate image component established by adding the gray-level value of the original image component to the gray value of the corresponding noisy artificial component gray level; and
(b) if the gray-level value of an image component in the set of original image components is outside the noisy range of the histogram, the gray-level value of the corresponding intermediate image component is double the gray-level value of the original image component; and
(8) dividing the gray-level values of the intermediate image components by the iteration count plus one to create a de-noised image having a de-noised histogram; and
(10) re-establishing the first histogram of gray-level values over the grayscale range based on the de-noised histogram.

13. The method of claim 12 further comprising the following steps performed prior to step (8):

(7-1) incrementing the iteration count by one;
(7-2) using the intermediate image as the noisy image and using the corresponding set of intermediate image components as the set of the original image components; and
(7-3) repeating steps (5) through (7) before proceeding to step (8).

14. A method of enhancing the quality of at least a portion of an electronic color image comprising a plurality of original image components, each original image component having at least two original color spectral constituents, each original color spectral constituent having one of a plurality of gray-level values that are distributed over a grayscale, the method comprising:
   using a processor to perform the steps of:
   (a) applying to each color spectral constituent an image enhancement method, the image enhancement method comprising:
      i. establishing a first histogram of the gray-level values over the grayscale for the color spectral constituent;
      ii. grouping the gray-level values for the color spectral constituent into a second histogram having a proper number of bins according to a criterion that establishes a quantitative measure of image enhancement, each bin containing a subset of the original image color spectral components of the at least a portion of the electronic color image;
      iii. redistributing the bins over the grayscale; and
      iv. deriving a gray level transformation function and ungrouping the subset of original image components from each bin according to the transformation function to produce an enhanced color spectral constituent;
   (b) identifying the color spectral constituent that has the best quantitative measure of image enhancement;
   (c) applying to each original color constituent the gray level transformation function for the color spectral component having the best quality enhancement measure, thereby creating enhanced color constituents each having enhanced image components; and
   (d) combining the enhanced color constituents to produce an enhanced electronic color image.

15. The method of claim 14 wherein the following steps are performed before step (b):
   establishing a noisy histogram $H_B(k)$ of a plurality of noisy image components selected from the original image components over a noisy portion of the electronic image, each noisy image component having a noisy gray-level value (k);
   rescaling the noisy histogram $H_B(k)$ and subtracting the rescaled noisy histogram from the first histogram to yield a de-noised histogram $H(k)$ according to the equation $$H(k) = \begin{cases} 0, & \text{if } H_I(k) - \frac{N_I}{N_B}\beta \cdot H_B(k) < 0 \\ H_I(k) - \frac{N_I}{N_B}\beta \cdot H_B(k), & \text{otherwise} \end{cases}$$

for k=0, 1, ..., M−1.
   where $H_I(k)$ is the first histogram, N is the number of the original image components, $N_B$ is the number of the noisy image components, and $\beta$ is a coefficient that scales the amplitude of $H_B(k)$ to approximately the amplitude of $H_I(k)$; and
   re-establishing the first histogram of gray-level values over the grayscale range based on the de-noised histogram.

16. The method of claim 14 wherein the following steps are performed before step (b):
   (1) establishing an iteration count equal to one;
   (2) defining a noisy grayscale range within the first histogram;
   (3) defining a set of noisy original image components within the noisy grayscale range of the first histogram;
   (4) analyzing the set of noisy original image components to determine a first noise statistical central tendency and a first noise statistical variance;
   (5) creating an artificial image having a plurality of artificial image components spatially equivalent and equal in number to the set of the original image components, each artificial image component having a gray-level value equal to the first noise statistical central tendency;
   (6) corrupting the artificial image by an artificial noise to create noisy artificial image components each having a noisy artificial image component gray level, the noisy artificial image components having an artificial noise statistical central tendency that is equal to the first noise statistical central tendency; and having an artificial noise statistical variance that equal to the first noise statistical variance;
   (7) combining the noisy artificial image components and the original image components to create an intermediate image having a set of corresponding intermediate image components that includes a set of noisy intermediate image components within the noisy grayscale range of the first histogram, the combining step comprising:
      (a) if the gray-level value of a original image component is within the noisy range of the histogram, establishing the gray-level value of the corresponding intermediate image component by adding the gray-level value of the original image component to the gray value of the corresponding noisy artificial component gray level; and
      (b) if the gray-level value of a original image component is outside the noisy range of the histogram, establishing the gray-level value of the corresponding intermediate image component by doubling the gray-level value of the original image component;
   (8) dividing the gray-level values of the intermediate image components by one more than the iteration count to create a de-noised image having a de-noised histogram; and
   (9) re-establishing the first histogram of gray levels over the grayscale range based on the de-noised histogram.

17. A method of enhancing the quality of at least a portion of an electronic color image comprising a plurality of original image components, each original image component comprising a hue value, a saturation value, and an intensity value, where the intensity value has one of a plurality of intensity values distributed over an intensity range, the method comprising:
   using a processor to perform the steps of:
   (a) applying an image enhancement method to the intensity values of the image components, the image enhancement method comprising:
      i. establishing a first histogram of the intensity values over the intensity range;
      ii. grouping the intensity values into a second histogram having a proper number of bins according to a criterion that establishes a quantitative measure of image enhancement, each bin containing a subset of the original image components of the at least a portion of the electronic image;
iii. redistributing the bins over the intensity range; and
iv. deriving an intensity transformation function and ungrouping the subset of original image components from each bin according to the transformation function to produce an enhanced intensity value for each image component; and
(b) combining the enhanced intensity value with the hue value and the saturation value for each original image component to produce enhanced image components in an enhanced electronic color image.

18. The method of claim 17 wherein the following steps are performed before step (b):
establishing a noisy histogram $H_B(k)$ of a plurality of noisy image components selected from the original image components over a noisy portion of the electronic color image, each noisy image component having a noisy enhanced intensity value (k);
rescaling the noisy histogram $H_B(k)$ and subtracting the rescaled noisy histogram from the first histogram to yield a de-noised histogram H(k) according to the equation $$H(k) = \begin{cases} 0, & \text{if } H_I(k) - \frac{N_I}{N_B}\beta \cdot H_B(k) < 0 \\ H_I(k) - \frac{N_I}{N_B}\beta \cdot H_B(k), & \text{otherwise} \end{cases}$$

for k=0, 1, . . . , M−1.
where $H_I(k)$ is the first histogram, N is the number of the original image components, $N_B$ is the number of the noisy image components, and β is a coefficient that scales the amplitude of $H_B(k)$ to approximately the amplitude of $H_I(k)$; and
re-establishing the first histogram of intensity values over the intensity range based on the de-noised histogram.

19. The method of claim 17 wherein the following steps are performed before step (b):
(1) establishing an iteration count equal to one;
(2) defining a noisy intensity range within the first histogram;
(3) defining a set of noisy image components within the noisy intensity range of the first histogram;
(4) analyzing the set of noisy image components to determine a first noise statistical central tendency and a first noise statistical variance;
(5) creating an artificial image having a plurality of artificial image components spatially equivalent and equal in number to the set of the original image components, each artificial image component having an intensity value equal to the first noise statistical central tendency;
(6) corrupting the artificial image by an artificial noise to create noisy artificial image components each having a noisy artificial image component intensity level, the noisy artificial image components having an artificial noise statistical central tendency that is equal to the original noise statistical central tendency and having an artificial noise statistical variance that equal to the original noise statistical variance;
(7) combining the noisy artificial image components and the original image components to create an intermediate image having a set of corresponding intermediate image components that include a set of noisy intermediate image components within the noisy intensity range of the first histogram, the combining step comprising:
(a) if the intensity value of a original image components is within the noisy range of the histogram, establishing the intensity value of the corresponding intermediate image component by adding the intensity value of the original image component to the intensity value of the corresponding noisy artificial component intensity value,
(b) if the intensity value of a original image components is outside the noisy range of the histogram, establishing the intensity value of the corresponding intermediate image component by doubling the intensity value of the original image component;
(8) dividing the intensity values of the intermediate image components by one more than the iteration count to create a de-noised image having a de-noised histogram; and
(9) re-establishing the first histogram of intensity levels over the intensity range based on the de-noised histogram.

* * * * *

UNITED STATES PATENT AND TRADEMARK OFFICE
CERTIFICATE OF CORRECTION

PATENT NO. : 7,840,066 B1
APPLICATION NO. : 11/598943
DATED : November 23, 2010
INVENTOR(S) : Zhiyu Chen, Besma Roui Abidi and Mongi Al Abidi Page 1 of 1

It is certified that error appears in the above-identified patent and that said Letters Patent is hereby corrected as shown below:

In the Specification

Column 1, Line 13, Insert the following statement:

-- GOVERNMENT RIGHTS

This invention was made with U.S. Government support under Grant Number DOE-DE-FG02-86NE37968 awarded by the Department of Energy. The U.S. Government has certain rights in the invention. --

Signed and Sealed this
Twenty-sixth Day of August, 2014

Michelle K. Lee
*Deputy Director of the United States Patent and Trademark Office*